US012701544B2

(12) United States Patent
Morales Ferre et al.

(10) Patent No.: US 12,701,544 B2
(45) Date of Patent: Aug. 4, 2026

(54) ORIENTATION DETERMINATION IN TELECOMMUNICATION SYSTEMS

(71) Applicant: Nokia Technologies Oy, Espoo (FI)

(72) Inventors: Ruben Morales Ferre, Tampere (FI);
Jukka Olavi Talvitie, Tampere (FI);
Mikko Säily, Espoo (FI); Mikko Valkama, Nokia (FI)

(73) Assignee: Nokia Technologies Oy, Espoo (FI)

( * ) Notice: Subject to any disclaimer, the term of this patent is extended or adjusted under 35 U.S.C. 154(b) by 364 days.

(21) Appl. No.: 18/492,957

(22) Filed: Oct. 24, 2023

(65) Prior Publication Data

US 2024/0155551 A1 May 9, 2024

(30) Foreign Application Priority Data

Nov. 1, 2022 (FI) ..................................... 20225974

(51) Int. Cl.
*H04W 64/00* (2009.01)
*H04L 27/12* (2006.01)

(52) U.S. Cl.
CPC ........... *H04W 64/006* (2013.01); *H04L 27/12* (2013.01)

(58) Field of Classification Search
CPC ...... H04W 64/006; H04W 16/28; H04L 27/12
See application file for complete search history.

(56) References Cited

U.S. PATENT DOCUMENTS

2003/0174096 A1* 9/2003 Mendolia ............. H01Q 9/0442
343/702
2007/0100548 A1 5/2007 Small

| | | | |
|---|---|---|---|
| 2011/0054834 A1* | 3/2011 | Partridge | ........... G01C 21/1654 |
| | | | 702/150 |
| 2012/0314588 A1* | 12/2012 | Nammi | ................. H04L 1/0027 |
| | | | 370/252 |
| 2016/0231415 A1 | 8/2016 | Liao et al. | |
| 2020/0213970 A1 | 7/2020 | Gabay | |
| 2020/0285926 A1* | 9/2020 | Bush | .................... G06N 3/0442 |
| 2021/0141076 A1 | 5/2021 | Ilic et al. | |
| 2021/0243752 A1 | 8/2021 | Bao et al. | |
| 2022/0167181 A1 | 5/2022 | Yu et al. | |
| 2022/0256519 A1 | 8/2022 | Jeon et al. | |

FOREIGN PATENT DOCUMENTS

| WO | 2022/003606 A1 | 1/2022 |
|---|---|---|
| WO | 2022/191901 A1 | 9/2022 |

OTHER PUBLICATIONS

"3rd Generation Partnership Project; Technical Specification Group Radio Access Network; Study on XR (Extended Reality) Evaluations for NR (Release 17)", 3GPP TR 38.838, V17.0.0, Dec. 2021, pp. 1-272.

(Continued)

*Primary Examiner* — Mohammad S Anwar

(74) *Attorney, Agent, or Firm* — Barta Jones, PLLC

(57) ABSTRACT

The present subject matter relates to an apparatus for a wireless communication system. The apparatus comprises means being configured for: receiving from one or more antennas of another apparatus, herein referred to as user apparatus, one or more antenna signals respectively; determining one or more frequency shifts of the one or more antenna signals respectively; determining an orientation of the user apparatus using the determined one or more frequency shifts.

8 Claims, 9 Drawing Sheets

(56) References Cited

OTHER PUBLICATIONS

"3rd Generation Partnership Project; Technical Specification Group Services and System Aspects; Extended Reality (XR) in 5G (Release 17)", 3GPP TR 26.928, V17.0.0, Apr. 2022, 131 pages.

Chen et al., "Micro-Doppler effect in radar: phenomenon, model, and simulation study", IEEE Transactions on Aerospace and Electronic Systems, vol. 42, No. 1, Jan. 2006, pp. 2-21.

Zhang et al., "Multistatic micro-Doppler signatures for rotation radius estimation", CIE International Conference on Radar (RADAR), Oct. 10-13, 2016, 4 pages.

Gažovová et al., "The Simulation Model for the Micro-Doppler Analysis", New Trends in Signal Processing (NTSP), Oct. 14-16, 2020, 6 pages.

"Msc-generator", Sourceforge, Retrieved on Nov. 21, 2023, Webpage available at : https://sourceforge.net/projects/msc-generator/.

Chen, "The Micro-Doppler Effect in Radar", Artech House, Second Edition, 2019, 370 pages.

Liu et al., "A Survey on Fundamental Limits of Integrated Sensing and Communication", IEEE Communications Surveys & Tutorials, vol. 24, No. 2, Secondquarter 2022, pp. 994-1034.

Office action received for corresponding Finnish Patent Application No. 20225974, dated Mar. 20, 2023, 12 pages.

* cited by examiner

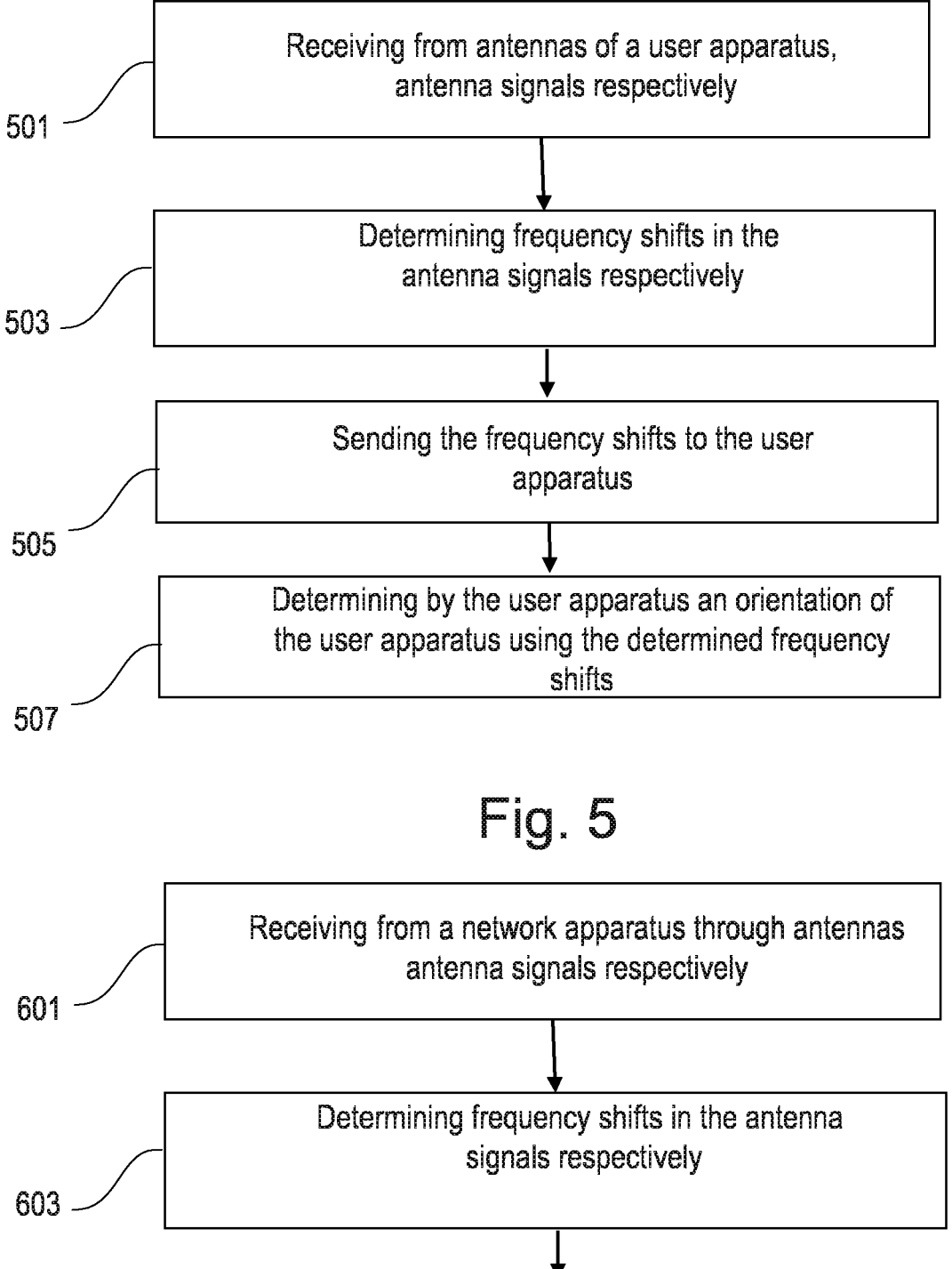

501 — Receiving from antennas of a user apparatus, antenna signals respectively

503 — Determining frequency shifts in the antenna signals respectively

505 — Sending the frequency shifts to the user apparatus

507 — Determining by the user apparatus an orientation of the user apparatus using the determined frequency shifts

Fig. 5

601 — Receiving from a network apparatus through antennas antenna signals respectively 603 — Determining frequency shifts in the antenna signals respectively 605 — Determining by the user apparatus an orientation of the user apparatus using the determined frequency shifts

Fig. 6

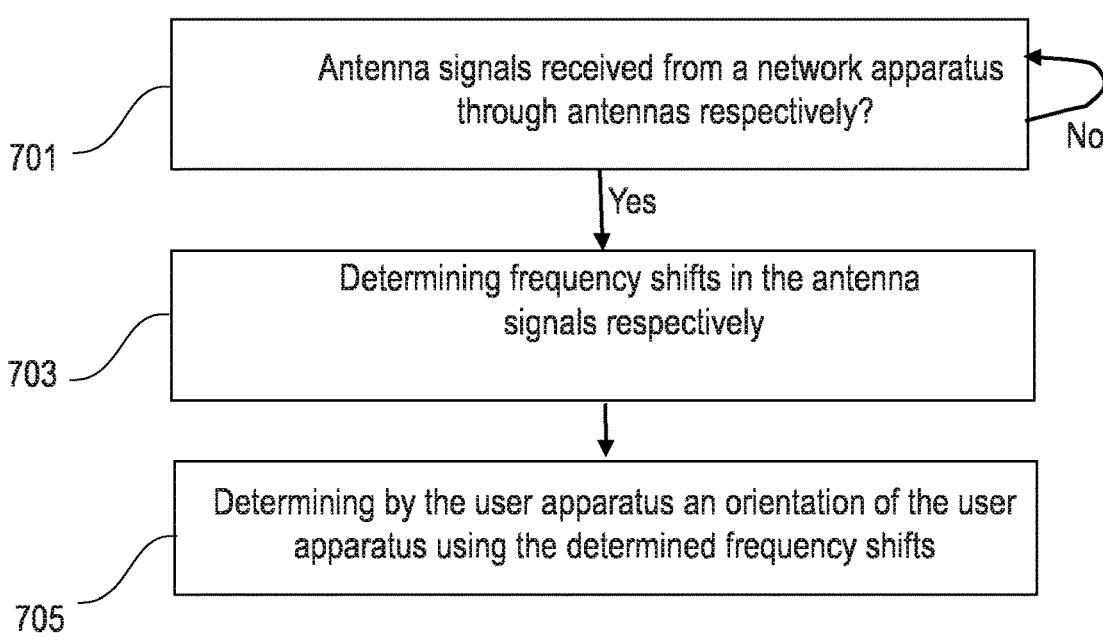

701 — Antenna signals received from a network apparatus through antennas respectively? — No Yes 703 — Determining frequency shifts in the antenna signals respectively 705 — Determining by the user apparatus an orientation of the user apparatus using the determined frequency shifts

Fig. 7

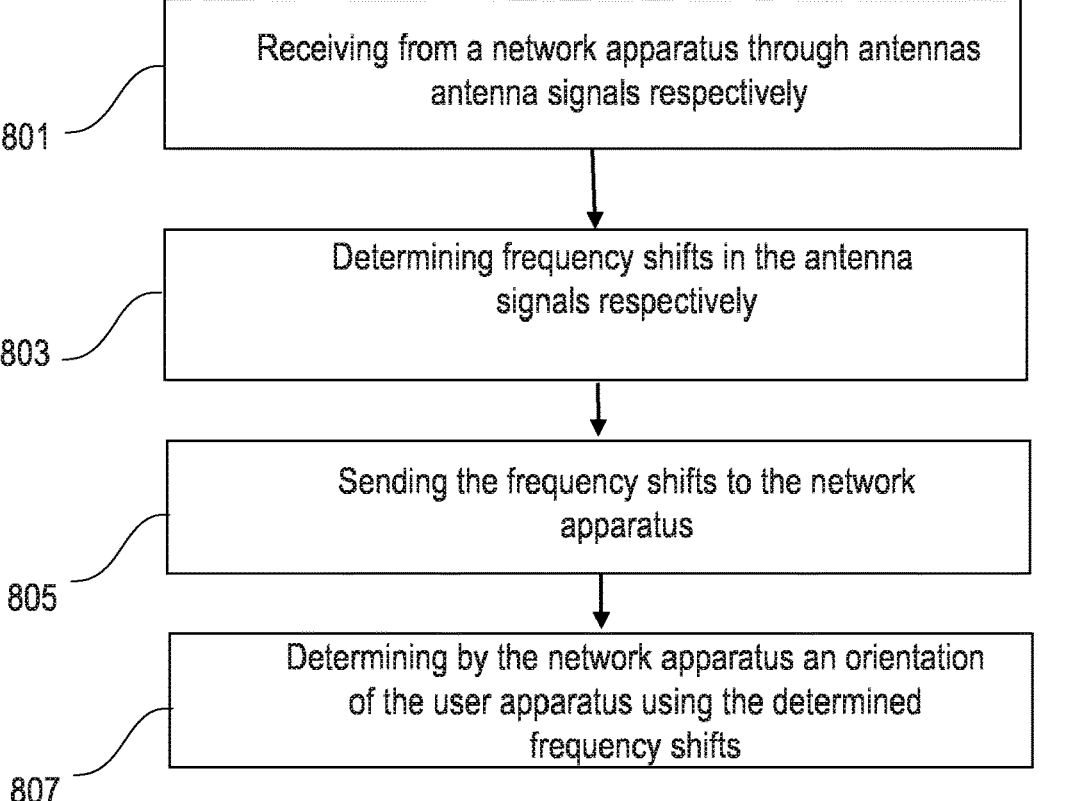

801 — Receiving from a network apparatus through antennas antenna signals respectively 803 — Determining frequency shifts in the antenna signals respectively 805 — Sending the frequency shifts to the network apparatus 807 — Determining by the network apparatus an orientation of the user apparatus using the determined frequency shifts

Fig. 8

Time [s]

Time [s]

ORIENTATION DETERMINATION IN TELECOMMUNICATION SYSTEMS

CROSS-REFERENCE TO RELATED APPLICATIONS

This application claims priority to, and the benefit of, Finland application No. 20225974 filed 1 Nov. 2022, which is incorporated herein by reference in its entirety.

TECHNICAL FIELD

Various example embodiments relate to telecommunication systems, and more particularly to orientation determination of an apparatus in a wireless communication system.

BACKGROUND

The fifth-generation wireless networks (5G) refer to a new generation of radio systems and network architecture. 5G is expected to provide higher bitrates and coverage than the current long-term evolution (LTE) systems. 5G is also expected to increase network expandability up to hundreds of thousands of connections. However, the support for new use cases, such as Extended Reality (XR) and several mission-critical applications, increases the requirements for improved performance.

SUMMARY

Example embodiments provide an apparatus for a wireless communication system, the apparatus comprising means being configured for: receiving from one or more antennas of another apparatus, herein referred to as user apparatus, one or more antenna signals respectively; determining one or more frequency shifts of the one or more antenna signals respectively; determining an orientation of the user apparatus using the determined one or more frequency shifts.

Example embodiments provide a method comprising: receiving by an apparatus from one or more antennas of a user apparatus, one or more antenna signals respectively; determining by the apparatus one or more frequency shifts of the one or more antenna signals respectively; determining by the apparatus an orientation of the user apparatus using the determined one or more frequency shifts.

Example embodiments provide a computer program comprising instructions which when executed by an apparatus, cause the apparatus to perform at least the following: receiving from antennas of a user apparatus, antenna signals respectively; determining one or more frequency shifts of the one or more antenna signals respectively; determining an orientation of the user apparatus using the determined one or more frequency shifts.

Example embodiments provide an apparatus, herein referred to as user apparatus, for a wireless communication system, the user apparatus comprising means being configured for: receiving a signal from another apparatus at one or more antennas of the user apparatus, resulting in one or more antenna signals; determining one or more frequency shifts of the one or more antenna signals respectively; determining an orientation of the user apparatus using the determined one or more frequency shifts.

Example embodiments provide a method comprising: receiving a signal from another apparatus at one or more antennas of a user apparatus, resulting in one or more antenna signals; determining by the user apparatus one or more frequency shifts of the one or more antenna signals respectively; determining by the user apparatus an orientation of the user apparatus using the determined one or more frequency shifts.

Example embodiments provide a computer program comprising instructions which when executed by an apparatus, cause the apparatus to perform at least the following: receiving a signal from another apparatus at one or more antennas of the apparatus, resulting in one or more antenna signals; determining one or more frequency shifts of the one or more antenna signals respectively; determining an orientation of the apparatus using the determined one or more frequency shifts.

Example embodiments provide a system comprising a user apparatus and another apparatus, the other apparatus comprising means being configured for: receiving from one or more antennas of the user apparatus, one or more antenna signals respectively; determining one or more frequency shifts of the one or more antenna signals respectively; determining an orientation of the user apparatus using the determined one or more frequency shifts.

Example embodiments provide a method comprising: receiving by an apparatus from one or more antennas of a user apparatus, one or more antenna signals respectively; determining by the apparatus one or more frequency shifts of the one or more antenna signals respectively; sending by the apparatus the frequency shifts to the user apparatus; determining by the user apparatus an orientation of the user apparatus using the received frequency shifts.

Example embodiments provide a system comprising a user apparatus and another apparatus, the user apparatus comprising means being configured for: receiving a signal from the other apparatus at one or more antennas of the user apparatus, resulting in one or more antenna signals; determining one or more frequency shifts of the one or more antenna signals respectively; sending the frequency shifts to the other apparatus; the other apparatus comprising means being configured for determining an orientation of the user apparatus using the received frequency shifts.

Example embodiments provide a method comprising: receiving a signal from another apparatus at one or more antennas of a user apparatus, resulting in one or more antenna signals; determining by the user apparatus one or more frequency shifts of the one or more antenna signals respectively; sending by the user apparatus the frequency shifts to the other apparatus; determining by the other apparatus an orientation of the user apparatus using the received frequency shifts.

BRIEF DESCRIPTION OF THE DRAWINGS

The accompanying figures are included to provide a further understanding of examples, and are incorporated in and constitute part of this specification. In the figures:

FIG. 5 is a flowchart of a method used in a network apparatus and a user apparatus according to an example of the present subject matter;

FIG. 6 is a flowchart of a method used in a user apparatus according to an example of the present subject matter;

FIG. 7 is a flowchart of a method used in a user apparatus according to an example of the present subject matter;

FIG. 8 is a flowchart of a method used in a user apparatus and a network apparatus according to an example of the present subject matter;

DETAILED DESCRIPTION

Figure 1:
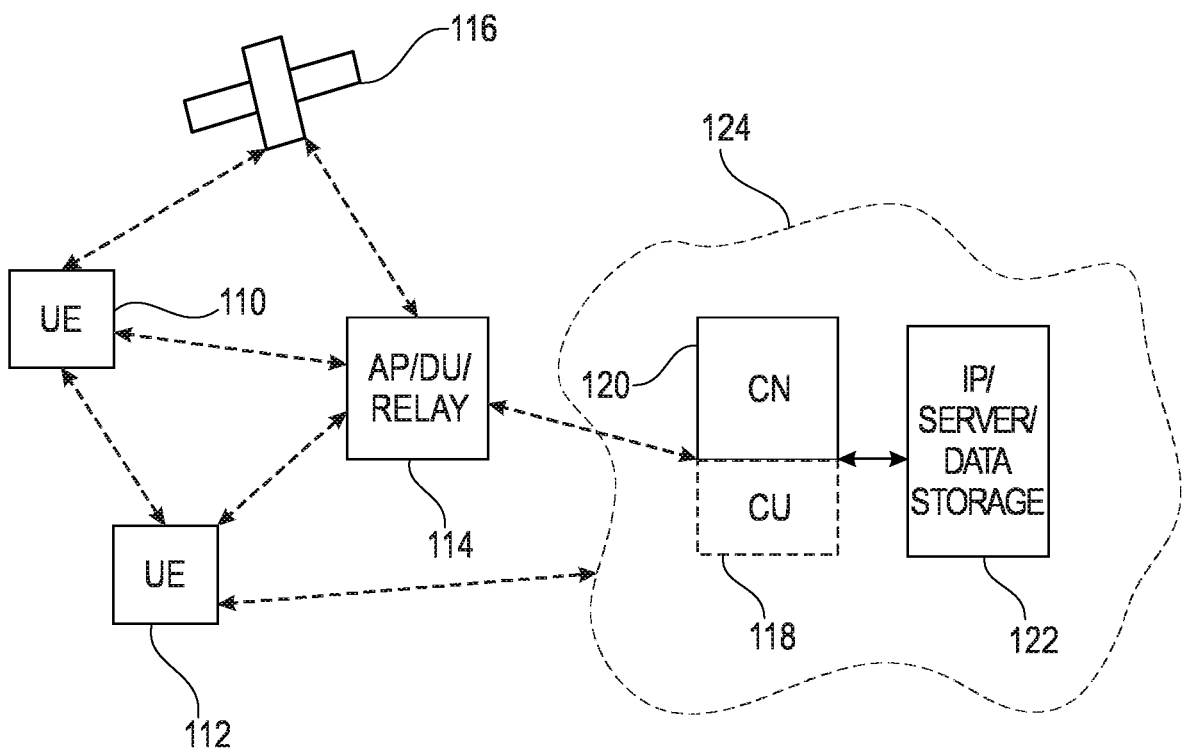
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

A communication system may be provided. The communication system comprises nodes such as base stations, wherein each node may serve user equipments (UEs) located within the node's geographical area of service or a cell. The communication system may support one or more Radio Access Technologies (RATs). A Radio Access Technology of the Radio Access Technologies may, for example, be evolved universal terrestrial radio access (E-UTRA) or 5G New Radio (NR), but it is not limited to, as a person skilled in the art may apply the present subject matter to other communication systems provided with necessary properties.

An apparatus, referred to herein as network apparatus, may be provided. Another apparatus, referred to herein as user apparatus, may be provided. The term "network apparatus" is used for naming purpose to make clear the description and to distinguish it from the other apparatus which is named "user apparatus". The network apparatus and the user apparatus may, for example, be part of the communication system. The network apparatus may be configured to send signals to the user apparatus and to receive signals from the user apparatus.

The network apparatus may, for example, be a base station, e.g., a Node B, enhanced or evolved NodeB (eNB), a home eNode B (HeNB), an access point (AP), a femto node, a femto base station, or any other equipment belonging to the communication system and implementing a radio communication interface or a direct communication interface with the user apparatus. Providing different types of network apparatuses may enable a flexible implementation of the present subject matter.

In some cases, the network apparatus or user apparatus may be a reference device, such as a positioning reference unit (PRU) which may be used to perform or assist in performing UE positioning and orientation determination. A PRU may be or may include, for example, a UE or other node device that may have one or more known characteristics (e.g., a known position and/or known antenna orientation and/or known Line of Sight (LOS) or non-LOS (NLOS) classification, and/or a known positioning measurement based on certain reference signals), which may perform positioning measurement(s) based on reference signals. According to an example, in some cases, these positioning measurements (e.g., range, angle of arrival (AOA), time difference of arrival (TDOA), received signal reference power (RSRP), LOS/NLOS status or classification) by the PRU may be used as a reference based on the known position and other known characteristics of the PRU.

The user apparatus may, for example, be a terminal such as a user equipment (UE), a subscriber terminal, a smartphone, a mobile station, a mobile phone, a headset, a portable computer, a pad computer or another type of wireless mobile communication device operating with or without a subscriber identification module (SIM). Providing different types of user apparatuses may enable a flexible implementation of the present subject matter.

The user apparatus may comprise a number N of antennas which may be referred to as $ANT_1, \ldots, ANT_N$, where the number N is higher than or equal to one, $N \geq 1$. Each antenna of the N antennas may be used to transmit and/or receive a signal by the user apparatus. A signal received by the user apparatus through an antenna may be referred to as receive antenna signal and a signal transmitted by the user apparatus through an antenna may be referred to as transmit antenna signal. For example, the receive antenna signal of the antenna $ANT_i$ may be referred to as $SR_i$ and the transmit antenna signal of the antenna $ANT_i$ may be referred to as $ST_i$, where i varies between 1 and N.

The present subject matter may advantageously use one or more receive antenna signals which are received from the network apparatus and/or use one or more transmit antenna signals which are sent to the network apparatus to determine the orientation of the user apparatus. The orientation may, for example, be used by an application to provide content (e.g., render or display the content) on the user apparatus. The content may, for example, comprise text data and/or video data and/or image data and/or sound data. The application may, for example, be running on the user apparatus. In another example, at least two of the user apparatus, the network apparatus and another apparatus such as a server, may collectively include machine readable code corresponding to instructions and/or data of the application for performing computer operations specified by the application. The application may, for example, be an XR application.

For example, the network apparatus may use one or more transmit antenna signals of respective antennas of the user apparatus to determine the orientation of the user apparatus, wherein the determined orientation may be referred to as network determined orientation. Additionally, or alternatively, the user apparatus may use one or more receive antenna signals of respective antennas of the user apparatus, which are received from the network apparatus, to determine the orientation of the user apparatus, wherein the determined orientation may be referred to as user determined orientation.

In one example, the user apparatus may send to the network apparatus a number $M^T$ of transmit antenna signals $ST_1, \ldots, ST_{M^T}$ through antennas $ANT_1, \ldots, ANT_{M^T}$ respectively, where $M^T \geq 1$. The transmit antenna signals may, for example, be transmitted at a predefined carrier frequency $f_c$. Each of the transmit antenna signals $ST_1, \ldots, ST_{M^T}$ may be a Sounding Reference Signal (SRS) or a specific reference signal. The network apparatus may receive the transmit antenna signals $ST_1, \ldots, ST_{M^T}$ using a transceiver at the network apparatus. The user apparatus may, for example, send the transmit antenna signals $ST_1, \ldots, ST_{M^T}$ automatically on a periodic basis or in response to launching or starting the application. Alternatively, the user apparatus may send the transmit antenna signals $ST_1, \ldots, ST_{M^T}$ in response to receiving a request e.g., from the network apparatus. The network apparatus may, for example, configure the user apparatus to send the transmit antenna signals $ST_1, \ldots, ST_{M^T}$. The user apparatus may, for example, send the transmit antenna signals $ST_1, \ldots, ST_{M^T}$ simultaneously. This may be advantageous as it may provide signals that represent the state of the user apparatus at the same point of time. This may enable an accurate determination of the orientation. Alternatively, the user apparatus may send the transmit antenna signals $ST_1, \ldots, ST_{M^T}$ during a time period whose duration is smaller than a duration threshold. The duration threshold may be predefined e.g., user defined. For example, the duration threshold may be determined based on the frequency of changes of the orientation of the user apparatus. The duration threshold may be the smallest frequency of changes of the orientation. The frequency may, for example, depend on the application being used at the user apparatus. For example, if the orientation of the user apparatus changes every 10 seconds, the duration threshold may be smaller than 10 seconds, e.g., the duration threshold is 9 seconds. Using a time period to send the signals may be advantageous as it may enable a flexibility in transmitting the signals by the user apparatus compared to sending them simultaneously.

The number MT of transmit antenna signals, which are sent by the user apparatus to the network apparatus, may be smaller than or equal to the number N of antennas, $M^T \leq N$. That is, the user apparatus may or may not use all antennas of the user apparatus to send transmit antenna signals to the network apparatus. In one example, the number M T of transmit antenna signals may be equal to the number N of antennas, $M^T = N$, meaning that the transmit antenna signals are sent to the network apparatus through all antennas of the user apparatus respectively. This may be advantageous because the higher the number of submitted signals the higher the accuracy of the determined orientation may be. In one example, the number MT of transmit antenna signals sent to the network apparatus may be smaller than the number N of antennas, $M^T < N$, meaning that the transmit antenna signals are sent through a subset of all antennas of the user apparatus respectively. This may be advantageous as it may save resources that would otherwise be required for using extra antennas while enabling a reliable determination of the orientation. The network apparatus may assign the received $M^T$ transmit antenna signals to respective antennas through which they are sent by, for example, using a multiplexing scheme such as time-division scheme, frequency-division (including Orthogonal Frequency Division Multiplexing (OFDM)) scheme, or code-division scheme. The network apparatus may use the received $M^T$ transmit antenna signals to determine frequency shifts caused by movement of the antennas $ANT_1, \ldots ANT_{M^T}$ respectively. The frequency shift may refer to a shift of the carrier frequency $f_c$. This may result in a number $M^T$ of frequency shifts which may be referred to as $$f_{D,1}^{net}, \ldots, f_{D,M^T}^{net}$$

respectively, where the superscript net indicates that the frequency shifts are determined at the network apparatus and $$f_{D,j}^{net}$$

is the frequency shift caused by movement of antenna $ANT_j$, where j varies between 1 and $M^T$. That is, the signals $ST_1, \ldots, ST_{M^T}$ received at the network apparatus may be used (e.g., by the network apparatus) to determine the frequency shifts $$f_{D,1}^{net}, \ldots, f_{D,M^T}^{net}$$

respectively.

The relative motion between the antenna $ANT_j$ of the user apparatus and the network apparatus may make the received signal in the network apparatus inconsistent with the transmitted signal in frequency. The frequency difference between the signal transmitted by the user apparatus through antenna $ANT_j$ and the corresponding signal received at the network apparatus may be the frequency shift $$f_{D,j}^{net}.$$

The frequency shifts $$f_{D,1}^{net}, \ldots, f_{D,M^T}^{net}$$

may be used to determine the orientation of the user apparatus. The present subject matter may be advantageous because it may provide the orientation of the user apparatus using one determined frequency shift e.g., $$f_{D,1}^{net},$$

caused by one antenna (e.g., for $M^T = 1$) of the user apparatus, or using two or more frequency shifts e.g., $$f_{D,1}^{net} \text{ and } f_{D,2}^{net}$$

caused by two or more antennas of the user apparatus respectively. In one example, the determination of the orientation of the user apparatus using the frequency shifts $$f_{D,1}^{net}, \ldots, f_{D,M^T}^{net}$$

may be performed at the network apparatus. In this case, the network determined orientation may be referred to as network-based determined orientation. Alternatively, the determination of the orientation of the user apparatus using frequency shifts $$f_{D,1}^{net}, \ldots, f_{D,M^T}^{net}$$

may be performed at the user apparatus which receives the frequency shifts $$f_{D,1}^{net}, \ldots, f_{D,M^T}^{net}$$

from the network apparatus. In this case, the network determined orientation may be referred to as network-assisted determined orientation.

In one example, the user apparatus may receive from the network apparatus a signal (e.g., such as Positioning Reference Signal (PRS)) through antennas $\text{ANT}_1, \ldots, \text{ANT}_{M^R}$ resulting in a number $M^R$ of receive antenna signals $SR_1, \ldots, SR_{M^R}$ respectively, where $M^R \geq 1$. The receive antenna signals may be transmitted by the network apparatus at the carrier frequency L. The number $M^R$ of receive antenna signals may be smaller than or equal to the number N of antennas $M^R \leq N$. That is, the user apparatus may or may not use all antennas of the user apparatus to receive the signal from the network apparatus. In one example, the number $M^R$ of receive antenna signals may be equal to the number N of antennas, $M^R = N$, meaning that the receive antenna signals are received from the network apparatus through all antennas of the user apparatus respectively. This may be advantageous because the higher the number of submitted signals the higher the accuracy of the determined orientation may be. In one example, the number $M^R$ of receive antenna signals received at the antennas may be smaller than the number N of antennas, $M^R < N$, meaning that the receive antenna signals are received through a subset of all antennas of the user apparatus respectively. This may be advantageous as it may save resources that would otherwise be required for using extra antennas while enabling a reliable determination of the orientation. The user apparatus may use the received $M^R$ receive antenna signals to determine frequency shifts due to the movement of the antennas $\text{ANT}_1, \ldots, \text{ANT}_{M^R}$ respectively. This may result in a number $M^R$ of frequency shifts which may be referred to as $$f_{D,1}^{U}, \ldots, f_{D,M^R}^{U}$$

respectively, where the superscript U indicates that the frequency shifts are determined at the user apparatus and $$f_{D,k}^{U}$$

is the frequency shift due to the movement of antenna $\text{ANT}_k$, where k varies between 1 and $M^R$. That is, the signals $SR_1, \ldots, SR_{M^R}$ received at the user apparatus may be used (e.g., by the user apparatus) to determine the frequency shifts $$f_{D,1}^{U}, \ldots, f_{D,M^R}^{U}$$

respectively.

The relative motion between the antenna $\text{ANT}_k$ of the user apparatus and the network apparatus may make the received signal in the user apparatus inconsistent with the transmitted signal in frequency. The frequency difference between the signal transmitted by the network apparatus and the corresponding signal received at antenna $\text{ANT}_k$ of the user apparatus may be the frequency shift $$f_{D,k}^{U}.$$

The frequency shifts $$f_{D,1}^{U}, \ldots, f_{D,M^R}^{U}$$

may be used to determine the orientation of the user apparatus. The present subject matter may be advantageous because it may provide the orientation of the user apparatus using one determined frequency shift e.g., $$f_{D,1}^{U}$$

caused by one antenna (e.g., $M^R = 1$) of the user apparatus, or using two or more frequency shifts e.g., $$f_{D,1}^{U} \text{ and } f_{D,2}^{U},$$

caused by two or more antennas of the user apparatus respectively. In one example, the determination of the orientation of the user apparatus using the frequency shifts $$f_{D,1}^{U}, \ldots, f_{D,M^R}^{U}$$

may be performed at the user apparatus. In this case, the user determined orientation may be referred to as user-based determined orientation. Alternatively, the determination of the orientation of the user apparatus using frequency shifts $$f_{D,1}^{U}, \ldots, f_{D,M^R}^{U}$$

may be performed at the network apparatus which receives the frequency shifts $$f_{D,1}^{U}, \ldots, f_{D,M^R}^{U}$$

from the user apparatus. In this case, the user determined orientation may be referred to as user-assisted determined orientation.

In one example, the orientation of the user apparatus that is provided by the present subject matter, and which may be referred to as final orientation, may be the user-based determined orientation. This may be advantageous in case the user apparatus may need to use locally the final orientation e.g., the application that provides the content based on the orientation is running at the user apparatus. Alternatively, the final orientation of the user apparatus may be the user-assisted determined orientation. This may be advantageous as the determination may be performed centrally and uniformly for different user apparatuses. Alternatively, the final orientation of the user apparatus may be the network-based determined orientation. This may particularly be advantageous in case the final orientation may be used at a central server such as an XR server that manages multiple user apparatuses. Alternatively, the final orientation of the user apparatus may be the network-assisted determined orientation. This may be advantageous as it may be more efficient to perform the determination at individual user apparatuses rather than performing all of them in one apparatus, the network apparatus. This may save resources at the network apparatus in particular when serving multiple user apparatuses.

In one example, the final orientation of the user apparatus may be derived from the network determined orientation and the user determined orientation, wherein the user determined orientation may be the user-assisted determined orientation or the user-based determined orientation and the network determined orientation may be the network-assisted determined orientation or the network-based determined orientation. Combining different determined orientations may provide an accurate final orientation.

This example may be referred to as a combined determination example. The derivation may, for example, be performed at the network apparatus and/or user apparatus. The apparatus that performs the derivation may receive the orientation that is determined by the other apparatus from the other apparatus. For example, the network determined orientation and the user determined orientation may be combined to obtain the final orientation. The combination may, for example, be an averaging, or a weighted averaging using weights assigned to the two different determined orientations. In this combined determination example, the number of receive antenna signals used to determine the user determined orientation may be equal to the number of transmit antenna signals used to determine the network determined orientation, $M^R = M^T$. This may be advantageous as it may provide consistent orientations by the two apparatuses. Alternatively, the number of receive antenna signals may be smaller than the number of transmit antenna signals $M^R < M^T$. This may particularly be advantageous as the user apparatus may have access to additional data such as sensor data that may help further refining the user determined orientation and compensate for that lack in the number of receive antenna signals. Alternatively, the number of receive antenna signals may be higher than the number of transmit antenna signals, $M^R > M^T$. This may be advantageous as the reception gain/efficiency at the network apparatus may be higher than at the user apparatus and thus a smaller number of signals may be sufficient. This may particularly be advantageous in case the network apparatus is a base station. In this combined determination example, the antennas $ANT_1, \ldots, ANT_{M^R}$ may be completely or partially overlapping with the antennas $ANT_1, \ldots, ANT_{M^T}$. Using the same antennas may provide consistent results while using different antennas may be advantageous as some antennas may be less performant than other antennas, and thus mixing the antennas may increase the accuracy of the determined orientation.

The final orientation of the user apparatus may repeatedly be determined as described herein. For example, the final orientation of the user apparatus may be determined on a periodic basis e.g., every second, every minute etc. The final orientation of the user apparatus may repeatedly be determined while the application is running. The final orientation of the user apparatus may be used to track the user apparatus. Tracking the orientation of the user apparatus may, for example, enable to produce outputs that are synchronized to the orientation of the user apparatus. The final orientation may be used by the application to provide content on the user apparatus.

The determination of the frequency shifts by the user apparatus and by the network apparatus may be performed using a configuration that is descriptive of the user apparatus and the network apparatus. The configuration that is descriptive of the user apparatus may be referred to as user apparatus configuration. The configuration that is descriptive of the network apparatus may be referred to as network apparatus configuration. The user apparatus configuration may, for example, indicate the frame of the user apparatus and the antenna configuration of the user apparatus. The antenna configuration may comprise the number of antennas and their positions in the user apparatus. The positions of the antennas may be positions with respect to the center point of rotation of the user apparatus. The position of the user apparatus may be defined as the center point of rotation of the user apparatus. The antenna configuration of the user apparatus may be defined or determined using received signals only by, for example, using measurements from multiple network apparatus antennas. These network apparatus antennas may be in the same network apparatus or in different network apparatuses. For example, the network apparatus may receive from other network apparatuses measurements of some or of all the network apparatus antennas. The measurements may be measurements related to or descriptive of the user apparatus. The network apparatus configuration may, for example, indicate the location of a transceiver of the network apparatus and/or the related reference angle of the network apparatus and/or the antenna configuration of the network apparatus. The antenna configuration of the network apparatus may comprise the number of antennas and their positions in the network apparatus. The user apparatus configuration and the network apparatus configuration may enable to determine, for example, the distance between the transceiver of the network apparatus and the center point of the user apparatus, and the angle from the transceiver of the network apparatus to the user apparatus, wherein the distance and the angle may be used to determine the frequency shifts. Additionally, the determination of the orientation by the user apparatus and/or by the network apparatus may be performed using sensor data that are obtained by the user apparatus. The sensor data may, for example, be acquired by a camera of the user apparatus and/or an Inertial Measurement Unit (IMU) of the user apparatus and/or other sensors that provide sensor data that can be used to determine the orientation of the user apparatus.

In case the network apparatus determines the frequency shifts $$f_{D,1}^{net}, \ldots, f_{D,M^T}^{net},$$

the user apparatus configuration may be received at the network apparatus from the user apparatus and the network apparatus configuration may be available at the network apparatus. In case the sensor data is used, the user apparatus may send the sensor data to the network apparatus. Alternatively, the user apparatus configuration and the network apparatus configuration may be stored in a shared database that may be accessed by the user apparatus, the network apparatus and other apparatuses of the communication system. In case the sensor data is used, the shared database may comprise the sensor data. Alternatively, the network apparatus may estimate the user apparatus configuration and/or the network apparatus configuration. The estimation may, for example, be performed using capability information of the user apparatus. The capability information may, for example, be UE capability information in case the user apparatus is a user equipment. The capability information may be provided, for example, by the user apparatus during an initial registration process in the communication system.

In case the user apparatus determines the frequency shifts $$f_{D,1}^{U}, \ldots, f_{D,M^{R}}^{U},$$

the user apparatus configuration may be part or stored in the user apparatus and the network apparatus configuration may be received from the network apparatus. Alternatively, the user apparatus configuration and the network apparatus configuration may be accessed by the user apparatus in the shared database. Alternatively, the user apparatus may estimate the user apparatus configuration and the network apparatus configuration e.g., using historic configuration data.

In one example, the determination of the orientation of the user apparatus may be performed during a positioning session. The positioning session may comprise an initiation phase immediately followed by a processing phase. The initiation phase may last a predefined first time period. The first time period may start upon a trigger signal e.g., sent from the user apparatus to the network apparatus or sent from the network apparatus to the user apparatus. During the initiation phase, the user apparatus and the network apparatus may exchange the user apparatus configuration, the sensor data and the network apparatus configuration. During the processing phase, the final orientation of the user apparatus may be determined at least one time as described herein.

In one example, the user apparatus configuration may be stored at once and reused for the determination of the orientation of the user apparatus. This may be advantageous as the configuration of the user apparatuses such as user equipment may not change over time. Alternatively, the user apparatus configuration may be updated in response to a change in the user apparatus that may affect the user apparatus configuration. For example, in response to the change, the shared database may be updated e.g., by the user apparatus or by a provider of the user apparatus, with a new user apparatus configuration that reflects the change. Alternatively, or additionally, the user apparatus may send the new user apparatus configuration to the network apparatus. The user apparatus may send the new apparatus configuration to the network apparatus using medium access control (MAC) layer signaling e.g., using MAC control elements (CEs). This may enable a low-latency operation. This may particularly be advantageous in case the changes of the configuration occur frequently. For example, if the positions of one or more antennas have changed in the user apparatus, the new user apparatus configuration may comprise the new positions of the antennas. This may be advantageous as it may ensure a reliable and accurate determination of the orientation of the user apparatus.

The frequency shifts may be defined by a micro-Doppler effect. The frequency shift $$f_{D,j}^{net}$$

may, for example, be a micro-Doppler frequency shift, where j varies between 1 and $M^{T}$. The frequency shift $$f_{D,k}^{U}$$

may, for example, be a micro-Doppler frequency shift, where k varies between 1 and $M^{R}$. The micro-Doppler effect may be caused by micro-motions of the antenna. The micro-motions may yield new features in the received signal that are distinct from its signature in the absence of micro-motions. For example, the micro-Doppler effect may be the shift in frequency of a wave that occurs when the wave source or the detector of the wave is moving. For example, the frequency shift $$f_{D,j}^{net}$$

may be caused by the rotation movement of the source of the transmit antenna signal which is the antenna $ANT_{j}$. The frequency shift $$f_{D,k}^{U}$$

may be caused by the rotation movement of the detector of the receive antenna signal which is the antenna $ANT_{k}$. The rotation movement may be defined by a rotation angle $\theta$ about an axis. The rotation movement may further be defined by the angular velocity $\omega$ of the user apparatus. According to the micro-Doppler effect, the frequency shift $$f_{D,j}^{net} \left( \text{and } f_{D,k}^{U} \right)$$

may be defined as function of only the rotation angle $\theta$ if the angular velocity $\omega$ is known, that is $$f_{D,j}^{net} = F(\theta).$$

In this case, a single measured frequency shift $$f_{D,j}^{net}$$

may be sufficient to determine the rotation angle $\theta$. The orientation of the user apparatus may be the rotation angle. In another example, the frequency shift $$f_{D,j}^{net} \left( \text{and } f_{D,k}^{U} \right)$$

may be defined as function of the rotation angle $\theta$ and the angular velocity $\omega$, that is $$f_{D,j}^{net} = F(\theta, \omega).$$

In this case, at least two measured frequency shifts may be required to determine the rotation angle $\theta$.

In one example, the frequency shift $$f_{D,j}^{net}$$

which is determined at the network apparatus may be caused by a micro-motion of rotation of the antenna $ANT_j$. The measured frequency shift $$f_{D,j}^{net}$$

in the transmit antenna signal $S_j$ after being received at the network apparatus may be used to obtain the rotation angle $\theta$ of the antenna $ANT_j$ that has transmitted the transmit antenna signal $ST_j$. For that, the model of the rotation-induced micro-Doppler frequency shift that is defined as a function of the rotation angle and the angular velocity may be used, such model may, for example, be defined as follows:

$$f_{D,j}^{net} = F(\theta, \omega) = \frac{f_c}{c} \frac{\omega r_j R_{BS} \sin(\theta + \alpha_j - \varphi)}{\sqrt{R_{BS}^2 + r_j^2 + 2 r_j R_{BS} \cos(\varphi - \theta - \alpha_j)}},$$

where the rotation angle $\theta$ and the angular velocity $\omega$ are unknown parameters and remaining parameters, $f_c$, $c$, $r_j$, $R_{BS}$, $\alpha_j$ and $\varphi$ may be known or predefined, where $r_j$ is the distance between the antenna $ANT_j$ and the center point of the user apparatus, $R_{BS}$ is the distance between the centre point of the user apparatus and the network apparatus, $\varphi$ is the angle from the network apparatus to the user apparatus e.g., $\varphi$ is the angle between center point of the network apparatus and center point of the user apparatus, $f_c$ is the carrier frequency, $\alpha_j$ is the angle between the antenna $ANT_j$ and the center point of the user apparatus when the user apparatus rotation is zero (i.e., $\theta=0$) and c is the speed of light. In this case, since there are two unknown parameters, the determination of the rotation angle $\theta$ may require at least two measured frequency shifts e.g., $$f_{D,1}^{net} \text{ and } f_{D,2}^{net}.$$

Alternatively, the angular velocity may also be provided as a known parameter, that is $$f_{D,j}^{net} = F(\theta).$$

This may, for example, be the case of an application that displays content on the user apparatus with pre-defined rotation movements of the user apparatus and the task is to identify the current position of the antenna knowing the velocity by which it rotates. This may also be the case if the angular velocity is provided by other means, such as a gyroscope sensor and reported to the network apparatus. In this case, the determination of the rotation angle $\theta$ may be performed using a single measured frequency shift $$f_{D,j}^{net}.$$

In one example, the frequency shift $$f_{D,k}^{U}$$

determined at the user apparatus may be caused by a micro-motion of rotation of the antenna $ANT_k$. The measured frequency shift $$f_{D,k}^{U}$$

in the receive antenna signal $SR_k$ after being received at the user apparatus may be used to obtain the rotation angle $\theta$ of the antenna $ANT_k$ that has received the receive antenna signal $SR_k$. For that, the model $$f_{D,j}^{net}$$

of the rotation-induced micro-Doppler frequency shift that is defined above as a function of the rotation angle and the angular velocity may be applied analogously, where some parameters may be the same, as they are reciprocal (e.g., $R_{BS}$). For example, the model for the micro-Doppler shift $$f_{D,k}^{U}$$

may be the same as the model of $$f_{D,j}^{net}$$

subject to adaptations that take into account the fact that the data used for determining $$f_{D,k}^{U}$$

is downlink data. In this case, since there are two unknown parameters, the determination of the rotation angle $\theta$ may require at least two measured frequency shifts e.g., $$f_{D,1}^{net} \text{ and } f_{D,2}^{net}.$$

Alternatively, the angular velocity may also be provided as a known parameter, that is $$f_{D,j}^{net} = F(\theta).$$

This may, for example, be the case of an application that displays content on the user apparatus with pre-defined rotation movements of the user apparatus and the only task is identify the current position of the antenna knowing the velocity by which it rotates. This may also be the case if the angular velocity is provided by other means, such as a gyroscope sensor and reported to the network apparatus. In this case, the determination of the rotation angle $\theta$ may be performed using a single measured frequency shift $$f_{D,k}^U.$$

In one example, the orientation determined by the network apparatus and the user apparatus is a relative orientation or an absolute orientation. The absolute orientation may indicate how the user apparatus is directed relative to a system of axes (named first system of axes) fixed relative to the ground. The relative orientation may indicate how the user apparatus is directed relative to a system of axes fixed relative to the user apparatus. The absolute orientation may be determined using the absolute positions which are defined relative to the first system of axes.

In one example, the user apparatus may be an XR device. The XR device may be a physical unit that may present immersive content to a user of the XR device. The content is considered immersive as it may produce visual, audio, haptic, or other sensory output that simulates or augments various aspects of the user's environment. This presentation of content may require tracking the user's motion in space so that the content may be presented in synchronization with the orientation or movement of the user apparatus. On a desktop client, the user apparatus may be a headset peripheral. In case the user apparatus is a mobile device, it may be provided with a viewer that enables to present the content.

In one example, the network apparatus and the user apparatus may communicate through a direct communication interface such as the PC5 interface. This may be advantageous as the present subject matter may be configured according to a NR sidelink scenario, for example, estimating the orientation using transmissions of reference signals for micro-Doppler measurement over a sidelink connection (PC5 interface). In this scenario, the user apparatus (e.g., a UE) may be able to estimate its orientation with respect to the network apparatus (which may be another UE) based on sidelink reference signals transmitted by the network apparatus.

In one example, the position of the user apparatus may further be determined e.g., in parallel to determining the final orientation of the user apparatus. The position of the user apparatus may be determined by the apparatus that determined the final orientation. This may enable to track both the rotation and the translation of the user apparatus. Tracking the movement of the user apparatus may, for example, enable to produce outputs that are synchronized to the movement of the user apparatus.

In one example, the network apparatus may be one network apparatus of a set of L network apparatuses, L≥2. The network apparatus may be referred to as first network apparatus, $NP_1$. In one example, a network-based determined orientation of the user apparatus may be determined by each further network apparatus $NP_l$ (where 1 varies between 2 and L) of the set of network apparatuses using a set of transmit antenna signals that have been sent by the user apparatus to the network apparatus $NP_l$. The user apparatus may send the set of transmit antenna signals to the set of network apparatuses sequentially one after the other. This may particularly be advantageous in case the same antennas are used to send the sets of the transmit antenna signals. In one example, the same antennas may be used to transmit each set of the transmit antenna signals to the respective network apparatus. That is, each network apparatus $NP_l$ may receive the transmit antenna signals $ST_1, \ldots, ST_{M^T}$ that have been received at the first network apparatus $NP_1$. Alternatively, two or more sets of the transmit antenna signals may be different in number of signals and/or in the antennas that have been used to send the set of the transmit antenna signals. This example may result in L network-based determined orientations that have been determined by the set of network apparatuses respectively. These L network-based determined orientations may be used individually by the application to provide the content. Alternatively, the L network-based determined orientations may be combined (e.g., averaged) so that the combined network-based determined orientation may be used by the application to provide the content.

The set of L network apparatuses may further advantageously be used to jointly track the orientation of the user apparatus, angular velocity of rotation of the user apparatus, position of the user apparatus, and velocity of the user apparatus. For that, a joint EKF-tracking may, for example, be performed only based on micro-Doppler frequency shift measurements obtained by three or more network apparatuses. This may, for example, be performed assuming Gaussian error with 5 HZ standard deviation, which may be more than 10% of the maximum Doppler. The position and orientation (but not the velocity or angular velocity of rotation of the user apparatus) of the user apparatus may be assumed to be known in the beginning (initialization). Alternatively, the position of the user apparatus may be measured at, for example, 1 second intervals. Here the position measurement of the user apparatus may be considered abstract and could be obtained with any suitable positioning method (e.g., ToA+clock, TDoA, AoA, AoD, carrier-phase, etc.). The variance of the error for the x and y coordinate of the position measurement may, for example, be defined as 30 cm (assuming Gaussian error). With this alternative implementation, the orientation and also position may be tracked without bias (after the EKF converges).

In one example, a user-assisted determined orientation of the user apparatus may be determined by each further network apparatus $NP_l$ using the frequency shifts $$f_{D,1}^{net}, \ldots, f_{D,M^R}^{net}$$

which may be sent by the user apparatus to the network apparatus $NP_l$. This may result in L user-assisted determined orientations that have been determined by the set of network apparatuses respectively. These L user-assisted determined orientations may be used individually by the application to provide the content. Alternatively, the L user-assisted determined orientations may be combined (e.g., averaged) so that the combined user-assisted determined orientation may be used by the application to provide the content.

In one example, an apparatus for a wireless communication system is provided, wherein the apparatus comprises means being configured for: receiving from one antenna of another apparatus, herein referred to as user apparatus, one antenna signal; determining a frequency shift of the antenna signal; determining an orientation of the user apparatus using the determined frequency shift. The determined frequency shift may, for example, be a micro-Doppler frequency shift.

In one example, an apparatus APP1 for a wireless communication system is provided, wherein the apparatus APP1 comprises means being configured for: receiving from $M^T$ antennas of another apparatus, herein referred to as user apparatus, $M^T$ antenna signals respectively, where $M^T$ is higher than or equal to one, $M^T \geq 1$. The $M^T$ antennas may be named $ANT_1, \ldots, ANT_{M^T}$ respectively. The $M^T$ antenna signals may be named $ST_1, \ldots, ST_{M^T}$ respectively. The means of APP1 are configured for using each received antenna signal ST 1 of the $M^T$ antenna signals for determining a frequency shift $$f_{D,j}^{net}$$

caused by a movement of the antenna $ANT_j (j=1, \ldots, M^T)$, resulting in $M^T$ frequency shifts. The means of APP1 are configured for determining an orientation of the user apparatus using the determined $M^T$ frequency shifts. The determined $M^T$ frequency shifts may, for example, be $M^T$ micro-Doppler frequency shifts respectively. The movement of the antenna may, for example, be considered as a micro-motion of the antenna such as a rotation of the antenna.

In one example, an apparatus APP2, herein referred to as user apparatus, for a wireless communication system is provided, wherein the user apparatus APP2 comprises means being configured for: receiving a signal from another apparatus at $M^R$ antennas of the user apparatus, that is $M^R$ antenna signals are received at the user apparatus, where $M^R$ is higher than or equal to one, $M^R \geq 1$. The $M^R$ antennas may be named $ANT_1, \ldots, ANT_{M^R}$ respectively. The $M^R$ antenna signals may be named $SR_1, \ldots SR_{M^R}$ respectively. The means of APP2 are configured for using each received antenna signal $SR_k$ of the $M^R$ antenna signals for determining a frequency shift $$f_{D,k}^{U}$$

caused by a movement of the antenna $ANT_k (k=1, \ldots, M^R)$, resulting in $M^R$ frequency shifts. The means of APP2 are configured for determining an orientation of the user apparatus using the determined $M^R$ frequency shifts. The determined $M^R$ frequency shifts may, for example, be $M^R$ micro-Doppler frequency shifts respectively. The movement of the antenna may, for example, be considered as a micro-motion of the antenna such as a rotation of the antenna.

The present subject matter may provide the following advantages. Introducing micro-Doppler measurements for 5G NR based UE orientation and rotation speed estimation may provide significant accuracy improvement compared to conventional phased antenna array based solutions. The present network-based UE orientation estimation approach may reduce estimation latency at the network side. The measurements may be obtained at the network (in uplink), which may remove the need of orientation reporting by the UE. Doppler measurements may provide information on the current change of rotation (rotation speed and angle). This may introduce predictability of the UE orientation for upcoming time instants, and consequently may enable pre-processing of system data in different application (e.g., XR rendering). Thus, at least part of the data may be processed beforehand, which may reduce computation latency and flatten peaks in the processing load. By avoiding/mitigating the need of orientation reporting of the UE in the above network-based scenario, the reliability/availability of the orientation information at the network side may be increased. Possible packet errors in signaling may be completely avoided. Considering the above-described improvements regarding the accuracy, latency and reliability/availability, the proposed method may enable various of new use cases, especially regarding mission-critical aspects in XR, Industrial robots, or Vehicles (e.g., for accurate steering).

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 110 and 112. The devices 110 and 112 may, for example, be user devices. The devices 110 and 112 are configured to be in a wireless connection on one or more communication channels with a node 114. The node 114 is further connected to a core network 120. In one example, the node 114 may be an access node (such as (e/g)NodeB) 114 providing or serving devices in a cell. In one example, the node 114 may be a non-3GPP access node. The physical link from a device to a (e/g)NodeB is called uplink or reverse link and the physical link from the (e/g) NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE.

Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 122, or utilize services provided by them. The communication network may also be able to support the usage of cloud services, for example at least part of core network operations may be carried out as a cloud service (this is depicted in FIG. 1 by "cloud" 124). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 114) and non-real time functions being carried out in a centralized manner (in a centralized unit, CU 118).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 116 in the mega-constellation may cover several satellite-enabled network entities that create on-ground cells. The on-ground cells may be created via an on-ground relay node 114 or by a gNB located on-ground or in a satellite.

It is understandable for a person skilled in the art that the depicted system is only an example of a part of a radio access system and in practice, the system may comprise a plurality of (e/g)NodeBs, the device may have access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
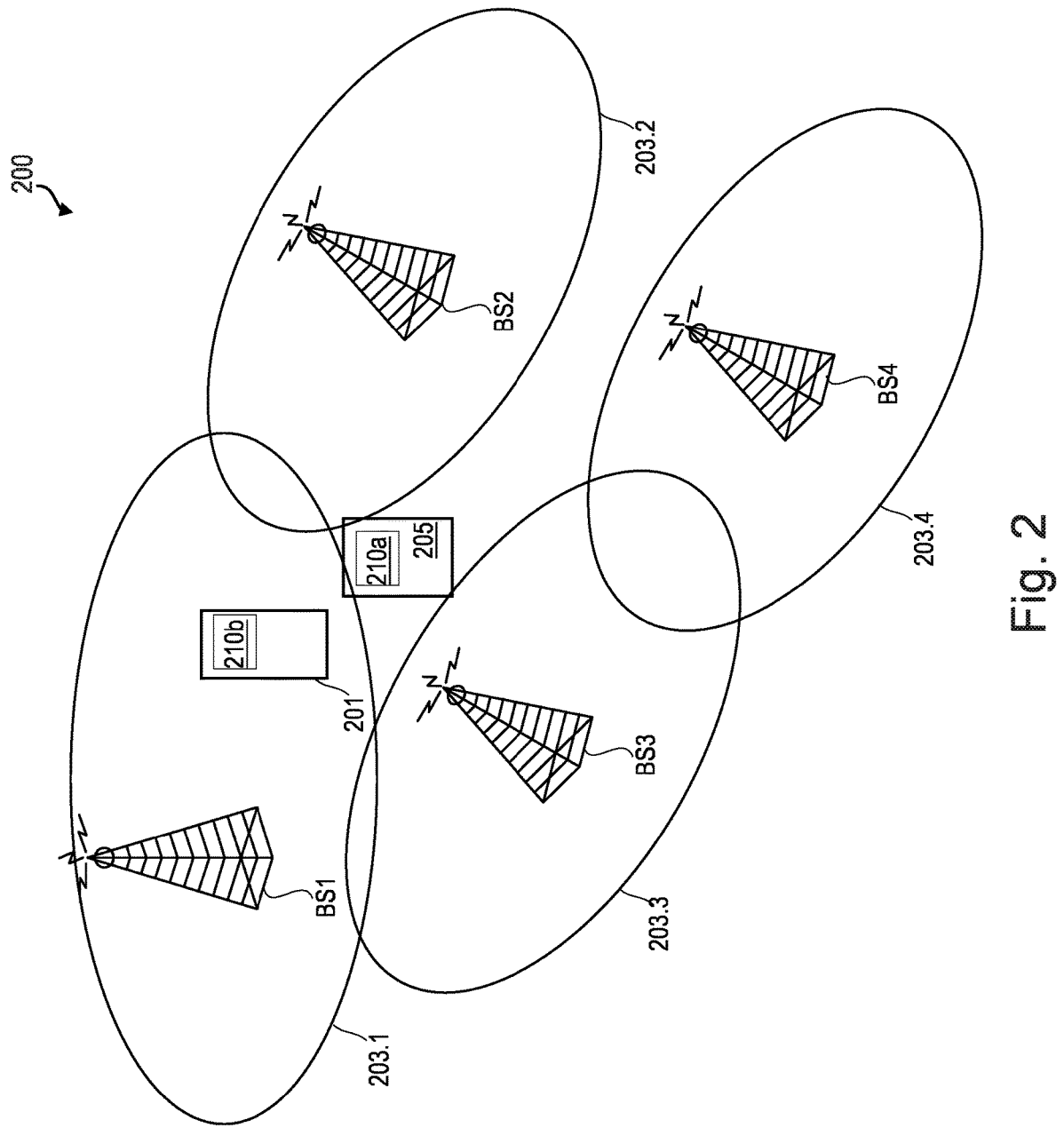
FIG. 2 is a schematic illustration of a wireless communication system.

FIG. 2 is a schematic illustration of a wireless communication system 200. The communication system 200 may be configured to use a time division duplex (TDD) technique for data transmission.

For simplicity, communication system 200 is shown to include four base stations BS1, BS2, BS3 and BS4 which may communicate with each other. Each base station of the base stations BS1, BS2, BS3 and BS4 may, for example, be eNodeB or gNB e.g., as described with reference to FIG. 1. That is, the communication system 200 may support a same RAT or different RATs.

Each base station of the base stations BS1 to BS4 may serve UEs within a respective geographical coverage area of service or cell 203.1-4. For simplicity, only one user equipment 201 is shown.

The communication system 200 may further comprise a server 205. The server 205 may, for example, communicate with the UE 201 through a network such as the internet. The server 205 may further be configured to communicate wirelessly with the base stations BS1, BS2, BS3 and BS4. The server 205 may comprise an application 210a.

In this particular example, the UE 201 may comprise multiple antennas. The UE 201 may be served by the base station BS1. The UE 201 may communicate with the base station BS1 over a wireless interface e.g., a radio interface. The UE 201 may, for example, communicate with the other base stations BS2, BS3 and BS4 through the base station BS1. The UE 201 may comprise an application 210b. The application 210b may comprise instructions that when executed on the UE 201 may cause the UE to display a content on the display device of the UE 201. The content may be provided based on the orientation of the UE 201. The content may be provided by the application 210a or may be provided remotely by the application 210b of the server 205. In the later case, the applications 210a and 210b may form two related parts of a same application.

Figure 3:
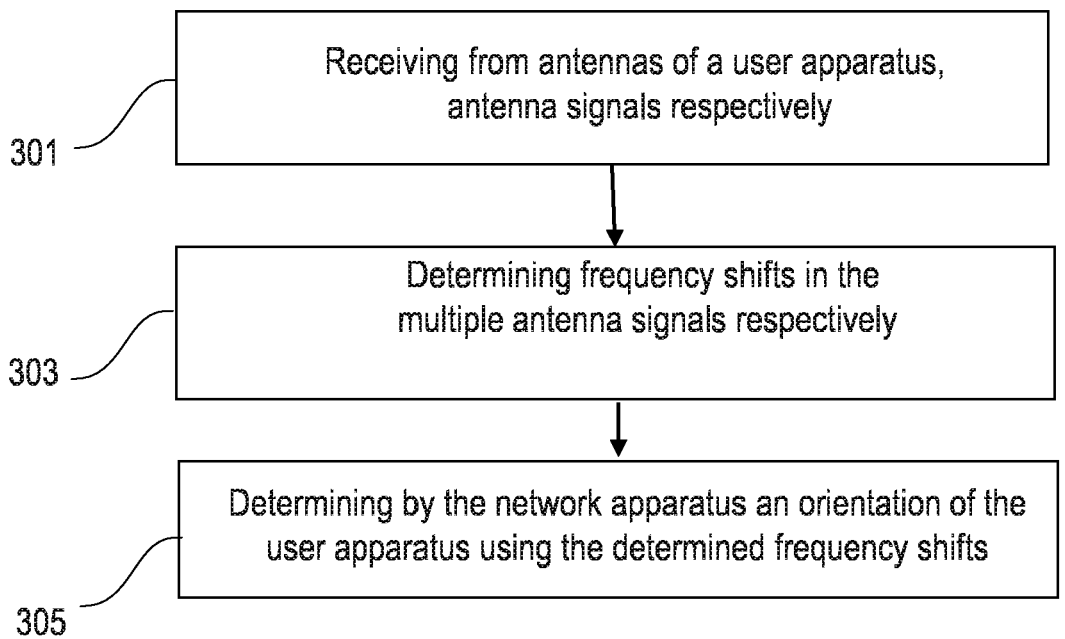
FIG. 3 is a flowchart of a method used in a network apparatus according to an example of the present subject matter.

FIG. 3 is a flowchart of a method according to an example of the present subject matter. For the purpose of explanation, the method described in FIG. 3 may be implemented in the system illustrated in FIG. 1 or FIG. 2, but is not limited to this implementation. The method may, for example, be performed by a network apparatus such as the base station BS1 or node 114, but it is not limited to as the skilled person may apply the present matter to another element of the communication system provided with necessary properties.

The network apparatus may receive in step 301 from antennas of a user apparatus, such as the user equipment 201, signals respectively. These signals may be named antenna signals.

In one example, the network apparatus may configure the user apparatus so that the user apparatus may send the signals through the antennas of the user apparatus respectively. In response to configuring the user apparatus, the network apparatus may receive the signals in step 301 from the user apparatus. Alternatively, the user apparatus may start the application 210a. The start of the application 210a may trigger the user apparatus to automatically send the antenna signals that are received in step 301. Alternatively, the user apparatus may automatically send the antenna signals on a periodic basis.

The network apparatus may determine in step 303 frequency shifts caused by the movement of the antennas of the user apparatus using the received antenna signals respectively. That is, for each distinct antenna of the user apparatus the network apparatus may determine in step 303 the frequency shift of a received antenna signal from said distinct antenna. The frequency shift may refer to a shift of the carrier frequency at which the antenna signals have been sent by the user apparatus.

The network apparatus may determine in step 305 an orientation of the user apparatus using the determined frequency shifts. The orientation may be determined by assuming that the frequency shift is caused by a specific micro-motion of the user apparatus. For example, this micro-motion may be a rotation motion.

Figure 9:
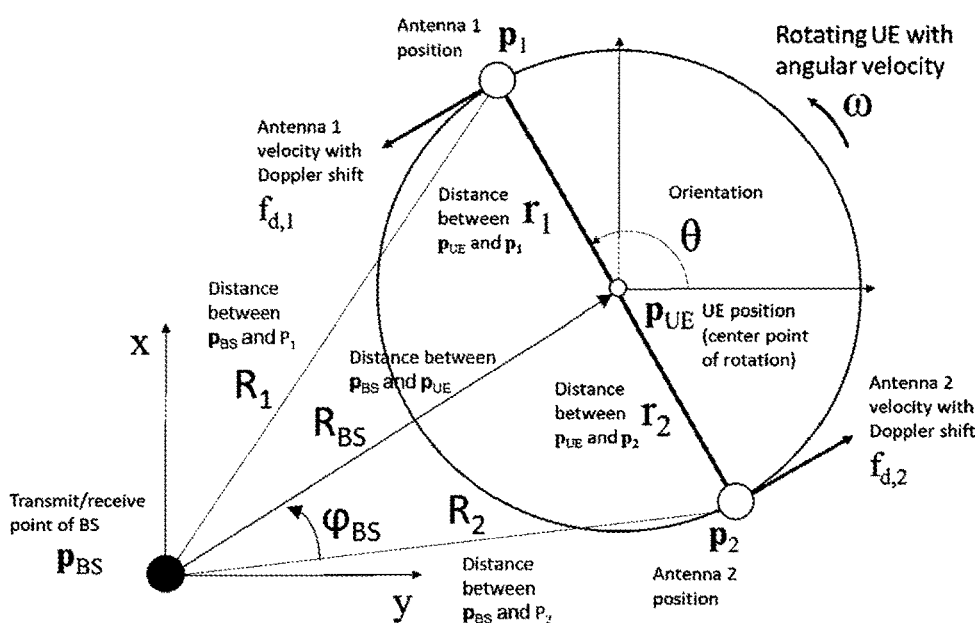
FIG. 9 is a diagram illustrating a method for determining an orientation of a user equipment according to an example of the present subject matter.

The determination of the frequency shifts and the orientation may, for example, be performed by using the user apparatus configuration and the network apparatus configuration. FIG. 9 provides an example implementation of steps 303 and 305.

The network apparatus may, for example, send the orientation to the user apparatus or to the server 205. The user apparatus or the server 205 may use the received orientation to accordingly provide e.g., display or render, the content on a display device of the user apparatus.

The method of FIG. 3 may be referred to as the network-based method.

Figure 4:
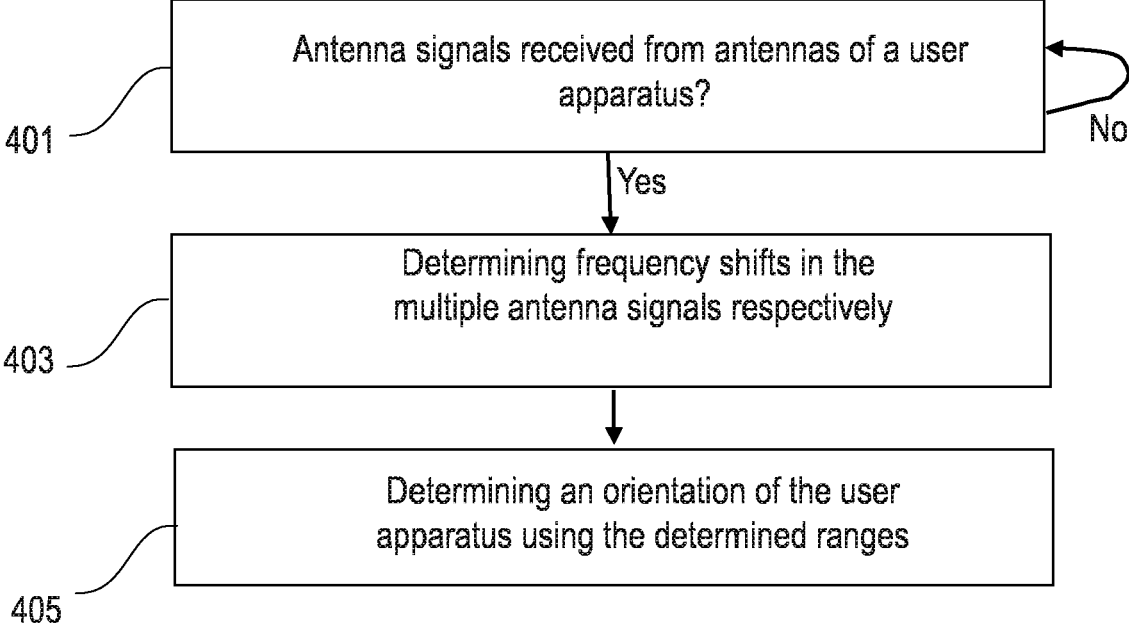
FIG. 4 is a flowchart of a method used in a network apparatus according to an example of the present subject matter.

FIG. 4 is a flowchart of a method according to an example of the present subject matter. For the purpose of explanation, the method described in FIG. 4 may be implemented in the system illustrated in FIG. 1 or FIG. 2, but is not limited to this implementation. The method may, for example, be performed by a network apparatus such as the base station BS1 or node 114, but it is not limited to as the skilled person may apply the present matter to another element of the communication system provided with necessary properties. In case (inquiry step 401) the network apparatus receives from antennas of a user apparatus, such as the user equipment 201, antenna signals respectively, the network apparatus may perform steps 403 to 405; otherwise, the network apparatus may wait for antenna signals to be received. The network apparatus may determine in step 403 frequency shifts in the received antenna signals respectively. The network apparatus may determine in step 405 an orientation of the user apparatus using the determined frequency shifts.

The method may enable to repeat the steps 401 to 405 for each set of received signals from the user apparatus. The method may be repeated until a stopping criterion is fulfilled or the network apparatus may wait until the stopping criterion is fulfilled. The stopping criterion may require that a maximum number of repetitions is reached or that the application 210a is stopped.

FIG. 5 is a flowchart of a method according to an example of the present subject matter. For the purpose of explanation, the method described in FIG. 5 may be implemented in the system illustrated in FIG. 1 or FIG. 2, but is not limited to this implementation. The method may, for example, be performed by a network apparatus such as the base station BS1 or the node 114 and by a user apparatus such as the user equipment 201 or 112, but it is not limited to as the skilled person may apply the present matter to other elements of the communication system provided with necessary properties.

The network apparatus may receive in step 501 from antennas of a user apparatus, such as the user equipment 201, antenna signals respectively. The network apparatus may determine in step 503 frequency shifts in the received antenna signals respectively. The network apparatus may send in step 505 the frequency shifts to the user apparatus. The user apparatus 201 may receive the frequency shifts and may determine in step 507 an orientation of the user apparatus using the received frequency shifts.

The method of FIG. 5 may be referred to as the network-assisted method.

FIG. 6 is a flowchart of a method according to an example of the present subject matter. For the purpose of explanation, the method described in FIG. 6 may be implemented in the system illustrated in FIG. 1 or FIG. 2, but is not limited to this implementation. The method may, for example, be performed by a user apparatus such as the user equipment 201 or 112, but it is not limited to as the skilled person may apply the present matter to another element of the communication system provided with necessary properties.

The user apparatus may receive a signal in step 601 from a network apparatus such as the base station BS1 or node 114, through multiple antennas of the user apparatus, resulting in multiple antenna signals (one received antenna signal per antenna).

In one example, the user apparatus may send a request to the network apparatus so that the network apparatus may send the signal to the user apparatus. In response to sending the request, the user apparatus may receive the signal in step 601 from the network apparatus. Alternatively, the user apparatus and the server 205 may start the application 210a and 210b. The start of the application 210a and 210b may trigger the network apparatus, through a trigger signal from the server 205 or from the user apparatus, to send the signal that is received in step 601. Alternatively, the network apparatus may automatically send the signal on a periodic basis to the user apparatus.

The user apparatus may determine in step 603 frequency shifts in the antenna signals respectively. The user apparatus may determine in step 605 an orientation of the user apparatus using the determined frequency shifts.

The determination of the frequency shifts and the orientation may, for example, be performed by using the user apparatus configuration and the network apparatus configuration.

The method of FIG. 6 may be referred to as the user apparatus-based method.

FIG. 7 is a flowchart of a method according to an example of the present subject matter. For the purpose of explanation, the method described in FIG. 7 may be implemented in the system illustrated in FIG. 1 or FIG. 2, but is not limited to this implementation. The method may, for example, be performed by a user apparatus such as the user equipment 201 or 112, but it is not limited to as the skilled person may apply the present matter to another element of the communication system provided with necessary properties.

In case (inquiry step 701) the user apparatus receives a signal from a network apparatus such as the base station BS1 or node 114, through multiple antennas of the user apparatus, resulting in multiple antenna signals, the user apparatus performs steps 703 to 705; otherwise, the user apparatus may wait for a signal to be received from the network apparatus. The user apparatus may determine in step 703 frequency shifts in the antenna signals respectively. The user apparatus may determine in step 705 an orientation of the user apparatus using the determined frequency shifts.

The method may enable to repeat the steps 701 to 705 for each received signal from the network apparatus. The method may be repeated until a stopping criterion is fulfilled or the user apparatus may wait until the stopping criterion is fulfilled. The stopping criterion may require that a maximum number of repetitions is reached or that the application is stopped.

FIG. 8 is a flowchart of a method according to an example of the present subject matter. For the purpose of explanation, the method described in FIG. 8 may be implemented in the system illustrated in FIG. 1 or FIG. 2, but is not limited to this implementation. The method may, for example, be performed by a user apparatus such as the user equipment 201 or 112 and by a network apparatus such as the base station BS1 or the node 114, but it is not limited to as the skilled person may apply the present matter to other elements of the communication system provided with necessary properties.

The user apparatus may receive a signal in step 801 from a network apparatus such as the base station BS1, through multiple antennas of the user apparatus, resulting in multiple antenna signals. The user apparatus may determine in step 803 frequency shifts in the antenna signals respectively. The user apparatus may send in step 805 the frequency shifts to the network apparatus. The network apparatus may determine in step 807 an orientation of the user apparatus using the determined frequency shifts.

The method of FIG. 8 may be referred to as the user apparatus-assisted method.

The present subject matter may be based on obtaining Doppler frequency shift measurements for a set of UE antennas with known locations with respect to the UE center point of rotation (referred to as the UE position). FIG. 9 illustrates the system geometry, composed by a gNB, with a center point located at $p_{BS}$, and a UE device equipped with two antennas with center point located at $p_{UE}$. The points $p_1$ and $p_2$ correspond to two UE antennas positions. In case of rotation (change in the UE orientation), the UE antennas rotate with respect to the center point of rotation $p_{UE}$ and $p_{BS}$. $R_{BS}$ and $\varphi_{BS}$ denote the distance and angle gNB-UE, respectively. The present subject matter may enable measuring and tracking the micro-Doppler frequency shift in each antenna $p_1$ and $p_2$ due to micro-motions (e.g., rotation), namely $f_{d,1}$ and $f_{d,2}$ which refer to micro-Doppler frequency shifts in FIG. 9. With these measurements, the UE orientation may be estimated and tracked. Based on the system geometry depicted in FIG. 9, the micro-Doppler measurement $f_{D,i}$ in the i-th antenna may be defined as $$f_{D,i} = \frac{f_c}{c} \frac{\omega r_i R_{BS} \sin(\theta + \alpha_i - \varphi)}{\sqrt{R_{BS}^2 + r_i^2 + 2r_i R_{BS} \cos(\varphi - \theta - \alpha_i)}},$$

where $\varphi = \varphi_{BS}$ is the angle between gNB center point and UE center, $f_c$ is the carrier frequency, c is the speed of light and $\omega$ is the angular velocity of the UE, i=1 or 2, $r_i$ is the distance between the antenna $p_i$ and the center point of the UE $p_{UE}$, $\alpha_i$ is the angle between the antenna $p_i$ and the center point of the UE $p_{UE}$ when the UE rotation is zero (i.e. $\theta$=0). The range between the gNB and the i-th UE antenna $R_i$ may, for example, be defined as $$R_i = \sqrt{R_{BS}^2 + r_i^2 + 2r_i R_{BS} \cos(\theta + \alpha_i - \varphi_{BS})}.$$

In order to solve the equation of the micro-Doppler frequency shift $$f_{D,i} = \frac{f_c}{c} \frac{\omega r_i R_{BS} \sin(\theta + \alpha_i - \varphi)}{\sqrt{R_{BS}^2 + r_i^2 + 2r_i R_{BS} \cos(\varphi - \theta - \alpha_i)}}$$

and obtaining the orientation $\theta$, different methods may be used for solving this non-linear equation. One practical solution may be the Gauss-Newton algorithm, which utilizes a gradient-based iterative search to minimize the least square error. As an input, the Gauss-Newton method requires the measurement model shown in the equation defining $f_{D,i}$ as well as the related Jacobian (i.e., the first-order derivative of the measurement model with respect to $\theta$). However, due to the dynamic relation between $\theta$ and $\omega$, Kalman-based filters (e.g., Extended Kalman Filter (EKF)) may be considered. In highly dynamic scenarios where the UE orientation changes rapidly, the benefit of micro-Doppler measurements may be that it can estimate the angular velocity, and thus track better the changes in the motion.

The considered framework between the gNB and UE can be also extended to a NR sidelink scenario, where measurements are obtained between two or multiple UEs. In addition, depending on the use case, UE orientation estimates can be considered both absolute or relative with respect to a chosen reference point/device. The proposed methods can be utilized in both DL and UL. Depending on the selected approach, it may be required to report certain parameters and/or measurements between the gNB and UE. This may directly affect the estimation latency. Therefore, the selected approach may be based on the underlying performance requirements. In order to reduce the latency reporting further, it is possible to extend the reporting of highly dynamic variables to MAC control elements which are transferred between the gNB and UE with very low latency. Besides DL and UL, the proposed methods can be used with any NR specified positioning approach, including the UE-based method, UE-assisted method, network-based method, and network-assisted method. Depending on the used approach, different type of information may be needed to be reported between the devices.

For example, the UE-based method may be performed using the following pre-configurations. A possible measurement signal to be transmitted may be a PRS signal. The UE antenna configuration and possibly the UE position may be known at the UE. gNB location or related reference angle, in case of absolute positioning, possibly gNB antenna configurations and possibly UE position may be signaled to the UE.

For example, the UE-assisted method may be performed using the following pre-configurations. A possible measurement signal to be transmitted may be PRS signal. A gNB location, gNB antenna configurations and possibly the UE position may be known at the gNB. The UE antenna configurations, frequency shift measurements and possibly the UE position may be signaled to the gNB.

For example, the network apparatus-based method may be performed using the following pre-configurations. A possible measurement signal to be transmitted may be SRS signal. A gNB location, gNB antenna configurations and possibly the UE position may be known at the gNB. The UE antenna configurations and possibly the UE position may be signaled to the gNB.

For example, the network apparatus-assisted method may be performed using the following pre-configurations. A possible measurement signal to be transmitted may be SRS signal. The UE antenna configuration and possibly the UE position are known at the UE. gNB location or related reference angle in case of absolute positioning, possibly gNB antenna configurations, frequency shift measurements and possibly the UE position may be signaled to the UE.

Figure 10A:
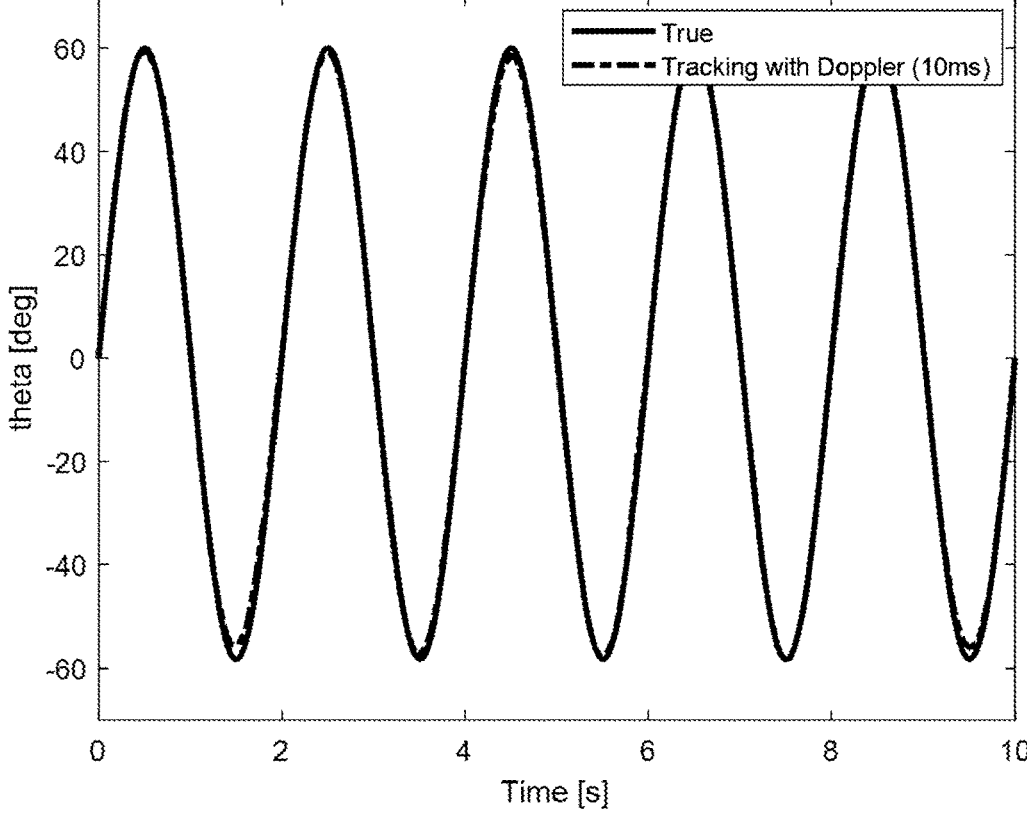
FIG. 10A is a plot showing comparisons of true orientations and orientations measured using the present subject matter.

FIG. 10A is a plot showing comparisons of true orientations (solid line) and orientations (dotted line) measured using the present subject matter. FIG. 10A shows the orientation tracking for a static UE with varying orientation. The solid line depicts the true UE orientation. Dotted line shows the tracked orientation using Doppler measurements only, taken at every 10 milliseconds (ms). Moreover, this method can simultaneously track the angular velocity using the same Doppler measurements as shown in FIG. 10C.

Figure 10B:
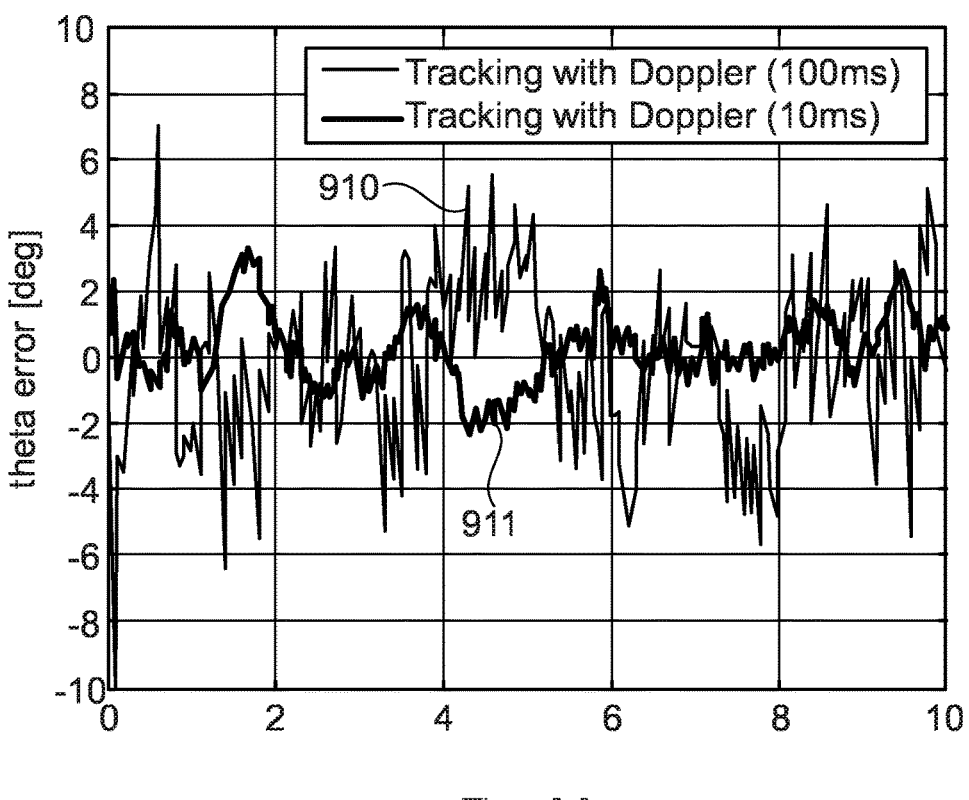
FIG. 10B is a plot showing comparisons of orientation errors measured using the present subject matter.

FIG. 10B is a plot showing comparisons of the orientation errors measured using the present subject matter. In particular, the orientation errors measured using the m-Doppler effect at every 100 ms (curve 910) are compared with the orientations measured using the m-Doppler effect at every 10 ms (curve 911).

Figure 10C:
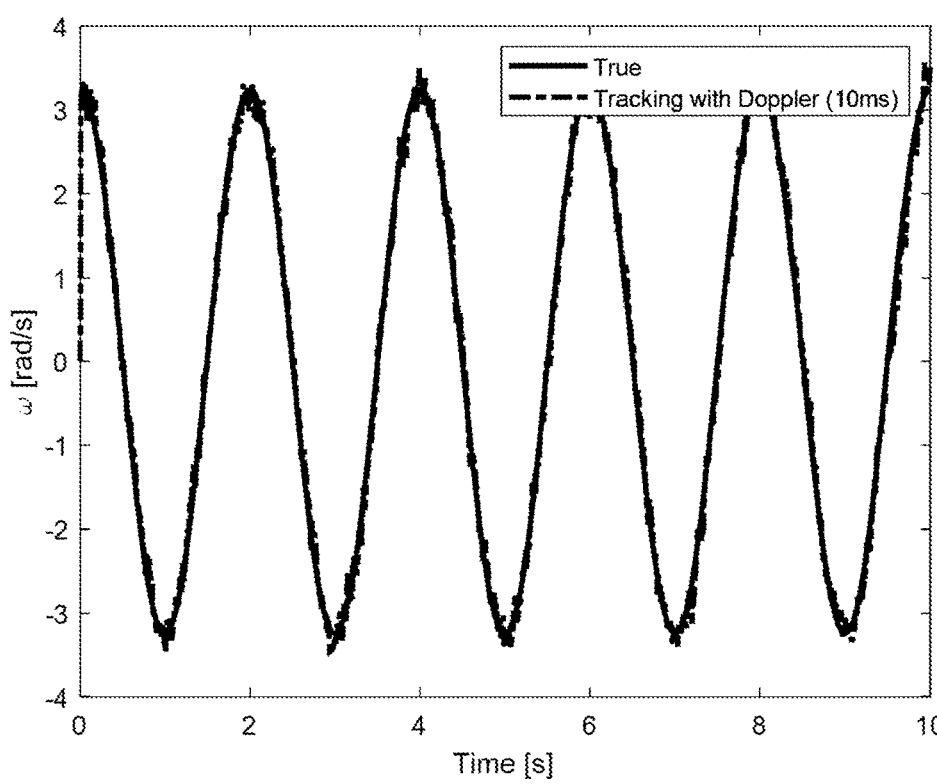
FIG. 10C is a plot showing comparisons of true angular velocities and angular velocities measured using the present subject matter.

FIG. 10C is a plot showing comparisons of true angular velocities (solid line) and angular velocities (dotted line) measured using the present subject matter. FIG. 10C shows the angular velocity tracking. The solid line depicts the true angular velocity of the UE. Dotted line shows the tracked angular velocity using Doppler measurements only, taken at every 10 milliseconds (ms). The agreement between the true values and the measured values indicate that the present method may accurately define the orientation and the angular velocity.

Figure 11:
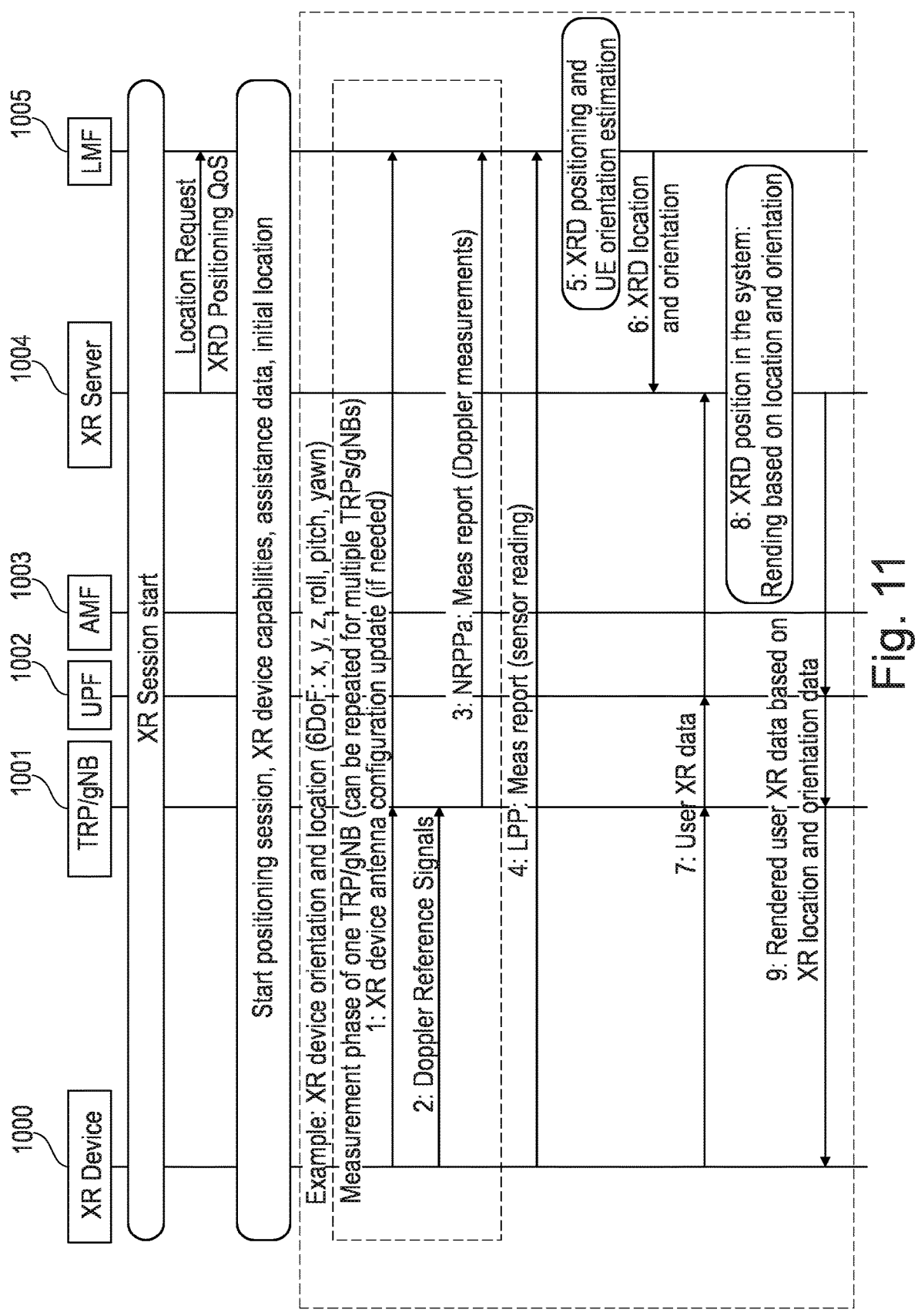
FIG. 11 depicts a signaling diagram of a network-based method for determining an orientation of an XR capable user equipment in accordance with an example of the present subject matter.

FIG. 11 depicts a signaling diagram of a network-based method for determining an orientation (and location) of an XR capable user equipment in accordance with an example of the present subject matter. The determination of the orientation and location may be performed according to six degrees of freedom such as the x, y and z coordinates and the dimension of movements: roll, pitch and yawn.

The signaling may consist of a generic quality of service (QoS) setup of positioning session for a XR capable UE, including UE capabilities, positioning assistance data and UE dimensions for rotation measurements. The XR capable UE may be a XR device. The UE dimensions may, for example, be obtained using a UE antenna configuration and UE body frame. The network-based method may be based on uplink transmission of a reference signal which is measured by a node 1001 such as a Transmission-Reception Point (TRP) or gNB. The reference signal may, for example, be a Sounding Reference Signal (SRS) or a specific micro-Doppler reference signal.

As indicated in FIG. 11, the network-based method may involve elements such as an XR device 1000, a node (e.g., TRP or gNB) 1001, a User Plane Function (UPF) 1002, Access and Mobility Management Function (AMF) 1003, XR server 1004 and a Location Management Function (LMF) 1005. The elements may be configured to create and start an XR session. This may cause the XR server 1004 to send to the LMF 1005 a request for a location of the XR device 1000. After that, a positioning session may start. The positioning session may be provided with configuration data such as XR device capabilities, initial location of the XR device etc. The following steps of the network-based method may be used to estimate the UE orientation for XR services e.g., during the positioning session.

If needed, a UE antenna configuration update may be reported by the XR device 1000 in step 1 to the LMF 1005. The UE antenna configuration may be required for UE orientation estimation at the LMF 1005. This may be needed only in case that the initial configurations regarding the considered transmission to the node 1001 have been changed.

A reference signal may be transmitted in step 2 in UL that enables the node 1001 to measure the micro-Doppler frequency shift per antenna. The reference signal may be a Doppler measurement reference signal or SRS. Reference signals from each UE antenna may be separable at the node 1001. This may be achieved by different multiplexing schemes, e.g., time-division, frequency-division (including OFDM), code-division, etc. Each reference signal may be uniquely associated to certain UE antenna. The reference signal in UL may enable estimation of the UE orientation estimation and rotation change rate at the network side. This may reduce latency by avoiding continuous UE orientation signaling towards network. This may increase reliability/availability of UE orientation estimate at the network side in poor channel conditions. Obtaining measurements from a reference signal which does not carry any data bits may typically tolerate more challenging channel conditions than receiving (demodulating/decoding) data bits. For example, if the UE would estimate the orientation (DL-based signals), the orientation data would be reported to the network. The node 1001 may report in step 3 the Doppler measurements to the LMF 1005. The Doppler measurements may include a separate measurement for each antenna, as reported in the UE antenna configuration (see initialization phase and/or step 1). This may allow positioning and UE orientation estimation (and rotation change rate) of the XR device 1000. Depending on the system configuration, the UE position/orientation estimate may be relative or absolute. In case of multiple available nodes (e.g., TRPs or gNBs), the steps 1 to 3 may be performed for each node 1001 separately to obtain measurements from all of them. If available or configured, the XR device 1000 may report available sensor readings in step 4 to the LMF 1005. The sensors may comprise an Inertial Measurement Unit (IMU) and a camera. This may be a UE-specific measurement, which is reported directly to the LMF 1005 without going through the node 1001. The step 4 may alternatively be performed before step 3. Based on the micro-Doppler measurements (from one or multiple TRP/gNB) and possible sensor readings, the LMF 1005 may compute in step 5 the node 1001 micro-Doppler shifts caused by each UE antenna, resulting the relative or absolute orientation of the user, e.g., the direction the headset is facing. The LMF 1005 may report in step 6 the location and orientation to XR Server 1004. The XR Server 1004 may receive in step 7 the user XR data in uplink. Steps 6 and 7 may be done in different order. The XR Server 1004 may render in step 8 the user XR data based on location and orientation. This step may include also processing other data for user pose, such as the camera signals. The XR server 1004 may deliver in step 9 the rendered data back to the XR device 1000.

Steps 1 to 3 of FIG. 11 may form a measurement phase. The measurement phase may be repeated for other nodes than the node 1001.

Thus, the present subject matter may, for example, be based on measuring accurate micro-Doppler shifts between a gNB (single or multiple antennas) and UE antennas. Assuming a known UE body frame with information on the antenna positions and distribution with respect to UE center point of rotation, it may be possible to estimate the UE orientation based on the micro-Doppler shift measurements obtained from each antenna. With the present subject matter, the UE orientation is estimated based on one-way Doppler measurements between the gNB and the different UE antennas. And there may be no need for large antenna arrays and no need for waiting the signal to travel back-and-forth. The device to be tracked (e.g., XR device) may be actively participating by either transmitting the signal or receiving and processing the signal.

Figure 12:
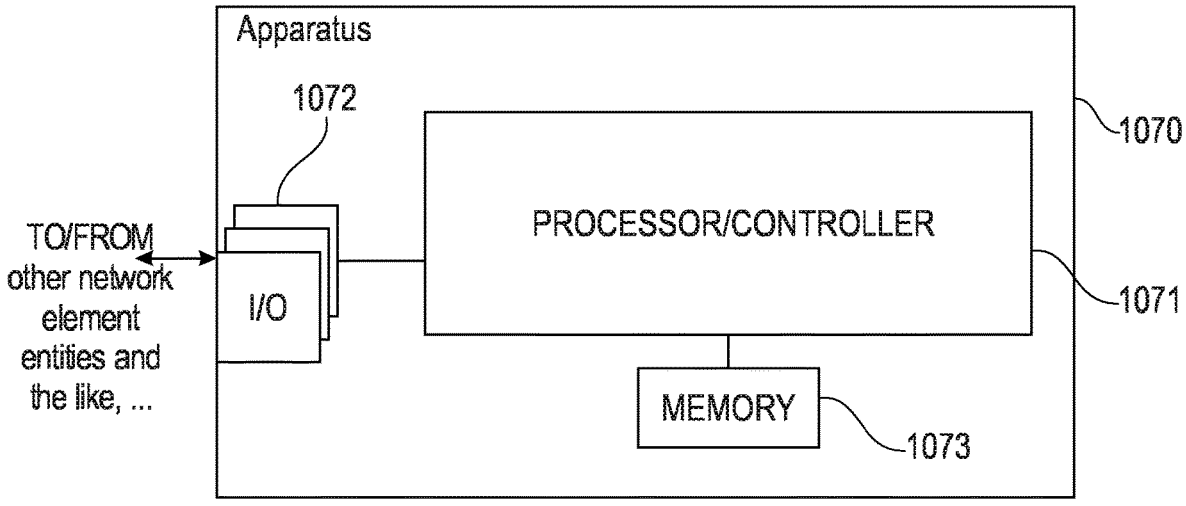
FIG. 12 is a block diagram showing an example of an apparatus according to an example of the present subject matter.

In FIG. 12, a block circuit diagram illustrating a configuration of an apparatus 1070 is shown, which is configured to implement at least part of the present subject matter. It is to be noted that the apparatus 1070 shown in FIG. 12 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above-described subject matter. In particular, the apparatus 1070 may be configured to perform the method as described in connection with FIG. 3, 4, 5, 6, 7, or 8.

For example, the processor 1071 is configured for: receiving from antennas of a user apparatus, antenna signals respectively; determining one or more frequency shifts of the one or more antenna signals respectively; determining an orientation of the user apparatus using the determined one or more frequency shifts.

Alternatively, the processor 1071 is configured for: receiving a signal from a network apparatus at one or more antennas of the apparatus, resulting in one or more antenna signals; determining one or more frequency shifts of the one or more antenna signals respectively; determining an orientation of the apparatus using the determined one or more frequency shifts.

The present subject matter may comprise the following examples and clauses.

Example 1: An apparatus, herein referred to as network apparatus, comprising: at least one processor; and at least one memory storing instructions that, when executed by the at least one processor, cause the network apparatus at least to perform: receiving from one or more antennas of another apparatus, herein referred to as user apparatus, one or more antenna signals respectively; determining one or more frequency shifts of the one or more antenna signals respectively; determining an orientation of the user apparatus using the determined one or more frequency shifts.

Example 2: An apparatus, herein referred to as user apparatus, comprising: at least one processor; and at least one memory storing instructions that, when executed by the at least one processor, cause the user apparatus at least to perform: receiving a signal from another apparatus at one or more antennas of the user apparatus, resulting in one or more antenna signals; determining one or more frequency shifts of the one or more antenna signals respectively; determining an orientation of the user apparatus using the determined one or more frequency shifts.

Example 3: A non-transitory computer readable medium comprising program instructions that, when executed by an apparatus, cause the apparatus to perform at least the following: receiving from antennas of a user apparatus, antenna signals respectively; determining one or more frequency shifts of the one or more antenna signals respectively; determining an orientation of the user apparatus using the determined one or more frequency shifts.

Example 4: A non-transitory computer readable medium comprising program instructions that, when executed by an apparatus, cause the apparatus to perform at least the following: receiving a signal from another apparatus at one or more antennas of the apparatus, resulting in one or more antenna signals; determining one or more frequency shifts of the one or more antenna signals respectively; determining an orientation of the apparatus using the determined one or more frequency shifts.

Clause 1. A system comprising a user apparatus and another apparatus, the other apparatus comprising means being configured for: receiving from one or more antennas of the user apparatus, one or more antenna signals respectively; determining one or more frequency shifts of the one or more antenna signals respectively; determining an orientation of the user apparatus using the determined one or more frequency shifts.

Clause 2. The system of clause 1, the means of the user apparatus being configured to send through the antennas the received antenna signals simultaneously.

Clause 3. The system of clause 1 or 2, the means of the user apparatus being configured to use the determined orientation to render a content on a display device of the user apparatus.

Clause 4. The system of clause 1, 2 or 3, the antenna signals being Sounding Reference Signals (SRSs).

Clause 4. A method comprising: receiving by an apparatus from one or more antennas of a user apparatus, one or more antenna signals respectively; determining by the apparatus one or more frequency shifts of the one or more antenna signals respectively; sending by the apparatus the frequency shifts to the user apparatus; determining by the user apparatus an orientation of the user apparatus using the received frequency shifts.

Clause 5. The method of clause 4, further comprising before the receiving, sending by the user apparatus through the antennas the antenna signals simultaneously.

Clause 6. The method of clause 5, being repeatedly performed for each further set of antenna signals to be transmitted.

Clause 7. A system comprising a user apparatus and another apparatus, the user apparatus comprising means being configured for: receiving a signal from the other apparatus at one or more antennas of the user apparatus, resulting in one or more antenna signals; determining one or more frequency shifts of the one or more antenna signals respectively; sending the frequency shifts to the other apparatus; the other apparatus comprising means being configured for determining an orientation of the user apparatus using the received frequency shifts.

Clause 8. A method comprising: receiving a signal from another apparatus at one or more antennas of a user apparatus, resulting in one or more antenna signals; determining by the user apparatus one or more frequency shifts of the one or more antenna signals respectively; sending by the user apparatus the frequency shifts to the other apparatus; determining by the other apparatus an orientation of the user apparatus using the received frequency shifts.

Clause 9. The method of clause 8, the received signal being a Positioning Reference Signal (PRS).

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances the computer executable code may be in the form of a high-level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

What is claimed is:

1. An apparatus operating as a Transmission-Reception Point (TRP) or gNodeB (gNB), the apparatus comprising:

at least one processor; and at least one memory storing instructions that, when executed by the at least one processor, cause the apparatus at least to:

establish a positioning session with a user apparatus to support an Extended Reality (XR) session, wherein the positioning session is initiated in response to a request from a Location Management Function (LMF) that is communicatively coupled to an XR server;

configure, as a part of the positioning session, the user apparatus to transmit a corresponding Sounding Reference Signal (SRS) from each of at least two antennas of the user apparatus on a periodic basis;

receive, from the user apparatus, a configuration of the user apparatus, wherein the configuration indicates positions of the at least two antennas with respect to a center point of rotation of the user apparatus, and wherein the configuration is received as an update via medium access control (MAC) layer signaling using one or more MAC control elements (CEs);

receive, from the user apparatus, sensor data, wherein the sensor data comprises data from at least one of an Inertial Measurement Unit (IMU) or a camera of the user apparatus;

receive, from the at least two antennas of the user apparatus through a radio interface or a direct link interface, at least two Sounding Reference Signals (SRSs), wherein the at least two SRSs are separable at the apparatus using a multiplexing scheme, wherein the multiplexing scheme includes time-division, frequency-division, Orthogonal Frequency Division Multiplexing (OFDM), or code-division, and wherein the direct link interface is a PC5 interface;

determine, from each of the at least two SRSs, a corresponding micro-Doppler frequency shift, wherein the corresponding micro-Doppler frequency shift is caused by a rotational micro-motion of the user apparatus, and wherein the determination is based on a model where each corresponding micro-Doppler frequency shift is proportional to:

a carrier frequency ($f_c$) of the corresponding SRS, and an angular velocity ($\omega$) of the user apparatus;

determine an orientation, an angular velocity, a location, a translational velocity of the user apparatus using the determined at least two micro-Doppler frequency shifts, the received sensor data, and the received configuration of the user apparatus; and send the determined orientation and the determined location to the XR server.

2. The apparatus of claim 1, wherein the apparatus receives the at least two SRSs simultaneously, concurrently or quasi concurrently.

3. A user apparatus, wherein the user apparatus is an Extended Reality (XR) device comprising a headset, the user apparatus comprising:

at least one processor;

at least two antennas;

at least one of an Inertial Measurement Unit (IMU) or a camera; and at least one memory storing instructions that, when
executed by the at least one processor, cause the user
apparatus at least to:

establish a positioning session with a Location Manage-
ment Function (LMF) in response to a location request
initiated by an XR Server, wherein the positioning
session has a Quality of Service (QoS) profile for an
XR service;

transmit, during an initiation phase of the positioning
session, an initial configuration of the user apparatus to
the LMF, wherein the configuration defines a body
frame of the user apparatus and positions of the at least
two antennas with respect to a center point of rotation
of the user apparatus;

transmit, from the at least two antennas to a Transmission-
Reception Point (TRP) or gNB, a plurality of Sounding
Reference Signals (SRSs), wherein the plurality of SRSs from each of the at least
two antennas are structured to be separable using one
of a time-division, frequency-division, or code-divi-
sion multiplexing scheme, and wherein each SRS of the plurality of SRSs is uniquely
associated with a respective antenna of the at least
two antennas;

transmit sensor data from the at least one of the Inertial
Measurement Unit (IMU) or the camera directly to the
LMF;

transmit, to the LMF, an updated configuration in
response to a change in the positions of one or more of
the at least two antennas using Medium Access Control
(MAC) layer signaling comprising one or more MAC
control elements (CEs), transmit, to an XR server, user XR data for rendering;

receive, from the XR server, rendered user XR data,
wherein the rendered user XR data is based on an
orientation and an angular velocity of the user appa-
ratus determined by the LMF from the transmitted
SRSs and the transmitted sensor data; and present, via the headset, the rendered user XR data as
immersive content synchronized with movement of
the user apparatus.

4. A system, comprising:

a first apparatus comprising a Transmission-Reception
Point (TRP) or gNodeB (gNB) the first apparatus
comprising:

at least first processor; and at least first memory storing instructions that, when
executed by the at least one processor, cause the first
apparatus at least to:

establish a positioning session with a user apparatus to
support an Extended Reality (XR) session;

configure, as a part of the positioning session, the user
apparatus to transmit a corresponding Sounding Ref-
erence Signal (SRS) from each of at least two
antennas of the user apparatus on a periodic basis;

receive, from the at least two antennas of a user
apparatus through a radio interface or a direct link
interface, at least two Sounding Reference Signals
(SRSs), wherein the at least two SRSs are separable at the
first apparatus using a multiplexing scheme, wherein the multiplexing scheme includes time-di-
vision, frequency-division, Orthogonal Frequency
Division Multiplexing (OFDM), or code-division,
and wherein the direct link interface is a PC5 interface;

determine, from each of the at least two SRSs, a
corresponding micro-Doppler frequency shift result-
ing in at least two micro-Doppler frequency shifts, wherein the corresponding micro-Doppler frequency
shift is caused by a micro-motion of the user
apparatus, wherein the micro-motion comprises a
rotation motion, and wherein the determination is based on a model where
each of the corresponding micro-Doppler fre-
quency shift is proportional to:

a carrier frequency ($f_c$) of the corresponding SRS,
and an angular velocity ($\omega$) of the user apparatus; and report, via NR Positioning Protocol A (NRPPa), the
determined at least two micro-Doppler frequency
shifts to a Location Management Function (LMF);
and a second apparatus comprising the LMF, the second
apparatus communicatively coupled to the first appa-
ratus, the second apparatus comprises:

at least second processor; and at least second memory storing instructions that, when
executed by the at least one processor, cause the
second apparatus to:

receive a location request for the user apparatus from
an Extended Reality (XR) Server;

establish the positioning session with the user appara-
tus, wherein the positioning session comprises:

an exchange of XR device capabilities, positioning assistance data, and an initial location of the user apparatus;

receive, from the first apparatus, the reported at least
two micro-Doppler frequency shifts;

receive sensor data from the user apparatus, wherein
the sensor data is received from at least one of an
Inertial Measurement Unit (IMU) or a camera of the
user apparatus;

determine an orientation, an angular velocity, and a
location of the user apparatus by performing a joint
Extended Kalman Filter (EKF) tracking configured
to track a state of the user apparatus, the state
comprising the orientation, the angular velocity, the
location, and a translational velocity of the user
apparatus using the determined at least two micro-
Doppler frequency shifts, the received sensor data,
and a configuration of the user apparatus, wherein the configuration indicates at least one of:

a body frame of the user apparatus, or positions of the antennas of the user apparatus with
respect to a center point of rotation of the user
apparatus, wherein the positions are defined by a
distance ($r_j$) from the center point of rotation and
an initial angle ($\alpha_j$) relative to the body frame of
the user apparatus, the configuration further indicating a distance ($R_{BS}$)
and an angle ($\varphi_{BS}$) between the TRP or gNB and
the center point of rotation of the user apparatus, wherein the configuration is initially exchanged dur-
ing the positioning session, wherein the second apparatus is further configured to
receive subsequent updates to the configuration
via medium access control (MAC) layer signaling,
and wherein the orientation is a relative orientation or
absolute orientation;

repeatedly cause the first apparatus to perform the receiving of the at least two SRSs and the determining of the at least two micro-Doppler frequency shifts and repeatedly perform the receiving of the sensor data and the determining of the orientation, angular velocity, and location at intervals of 10 milliseconds or less; and send the determined orientation, the angular velocity and the location as a six degrees of freedom (6DoF) state to the XR Server for rendering user XR data after receiving the user XR data from the user apparatus, wherein the rendering is synchronized with the determined orientation, the angular velocity, and the location, wherein the rendering comprises pre-processing of the user XR data based on a predicted future 6DoF state derived from the determined angular velocity and the translational velocity, and wherein the XR Server is further configured to deliver the rendered user XR data back to the user apparatus.

5. The system of claim 4, wherein the pre-processing of the user XR data based on the predicted future 6DoF state enables at least part of the user XR data to be processed beforehand.

6. The system of claim 4, wherein the configuration is updated by the user apparatus in response to a change in the user apparatus that affects the configuration, wherein the change comprises a change in the positions of the at least two antennas.

7. The system of claim 6, wherein the first apparatus is one of a set of L network apparatuses, where L≥2, and wherein the joint EKF tracking performed by the second apparatus is based on micro-Doppler frequency shift measurements received from each of the L network apparatuses to perform the joint EKF tracking for the user apparatus.

8. The system of claim 4, wherein, the direct link interface is the PC5 interface, and wherein the first apparatus is another user apparatus, and the orientation is determined with respect to the another user apparatus based on sidelink reference signals transmitted over the PC5 interface.

\* \* \* \* \*